(12) United States Patent
Endo et al.

(10) Patent No.: US 7,400,421 B2
(45) Date of Patent: Jul. 15, 2008

(54) IMAGE PROCESSING METHOD AND IMAGE PROCESSING SYSTEM USING THE SAME

(75) Inventors: Masakatsu Endo, Nagano (JP); Hideki Morozumi, Nagano (JP); Kenji Sakuda, Nagano (JP); Kazunori Suenaga, Nagano (JP); Makoto Oyanagi, Nagano (JP); Toshihiko Katayama, Nagano (JP); Yoichi Wakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 768 days.

(21) Appl. No.: 10/734,523

(22) Filed: Dec. 12, 2003

(65) Prior Publication Data

US 2004/0184078 A1 Sep. 23, 2004

(30) Foreign Application Priority Data

Dec. 12, 2002 (JP) .......................... P2002-360983
Apr. 4, 2003 (JP) .......................... P2003-101848

(51) Int. Cl.
*H04N 1/40* (2006.01)
(52) U.S. Cl. ..................... 358/1.13; 358/468
(58) Field of Classification Search ................ 358/1.9, 358/1.13, 1.15–1.16, 434–439, 468
See application file for complete search history.

(56) References Cited

U.S. PATENT DOCUMENTS 5,754,876 A * 5/1998 Tamaki et al. .................. 712/4

FOREIGN PATENT DOCUMENTS

JP 2000242461 A * 9/2000
JP 2002-330394 11/2002

OTHER PUBLICATIONS

Abstract of Japanese Patent Publication No. 2002-330394, Pub. Date: Nov. 15, 2002, Patent Abstracts of Japan.

* cited by examiner

*Primary Examiner*—Edward L. Coles
*Assistant Examiner*—Stephen Brinich
(74) *Attorney, Agent, or Firm*—Martine Penilla & Gencarella, LLP

(57) ABSTRACT

At one of an image supply device storing image data and an image output device performing image processing with respect to the image data which are connected via a communication path through which the image data is communicated, one of a text command described by a markup language and a binary command described by a binary is selected as a command including a control information item for the image processing. From one of the image supply device and the image output device to the other, the selected one of the text command and the binary command is transmitted. At the other one of the image supply device and the image output device, it is performed processing specified by the control information included in the selected one of the text command and the binary command.

11 Claims, 18 Drawing Sheets

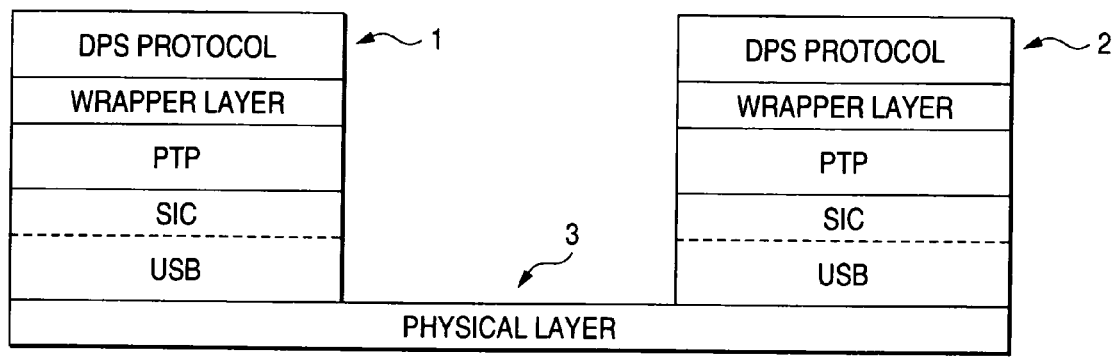

FIG. 10

```
<?xml version="1.0"?>
<dps xmlns="http://www.xxxx">
  <startJobRequest>
    <job>
      <jobConfig>
        <quality>01000000</quality>
        <paperSize>02010000</paperSize>
        <paperType>03020000</paperType>
        <fileType>04150000</fileType>
        <date>05010000</date>
        <fileName>06000000</fileName>
        <imageOptimize>07000000</imageOptimize>
        <layoutItem>08010000</layoutItem>
      </jobConfig>
      <printInfo>
        <image>
          <imageID>00000001</imageID>
          <imageDate>2002/05/30</imageDate>
        </image>
      </printInfo>
    </job>
  </startJobRequest>
</dps>
```

FIG. 11

```
<?xml version="1.0"?>
<dps xmlns="http://www.xxxx">
  <getFileRequest>
    <fileID>00000001</fileID>
    <buffPtr>00100000</buffPtr>
  </getFileRequest>
</dps>
```

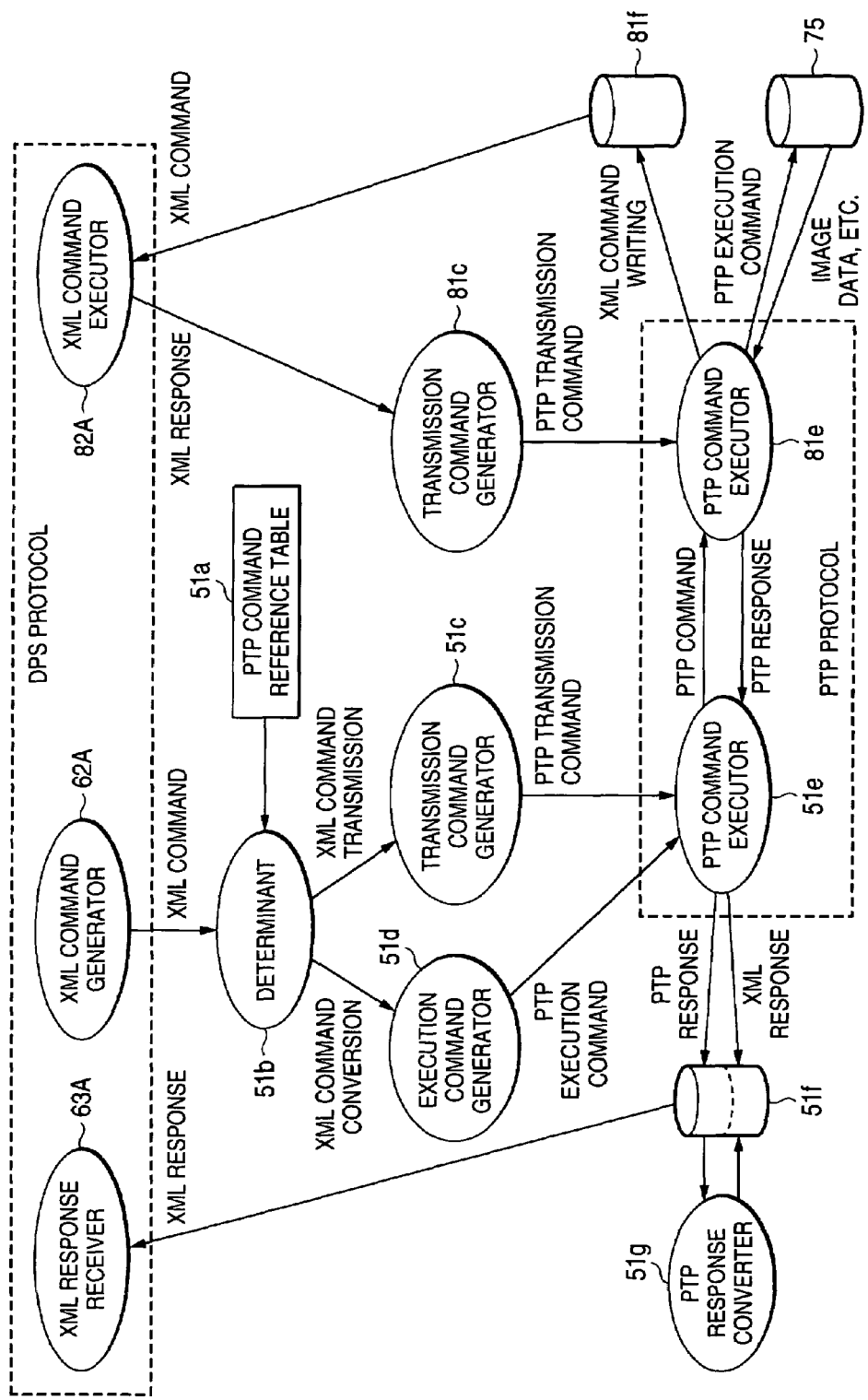

FIG. 14A
```
<?xml version="1.0"?>
<dps xmlns="http://www.xxxx">
    <GetFileInfoRequest>
        <fileID>00000001</fileID>
    </GetFileInfoRequest>
</dps>
```

FIG. 14B
```
ptpObjectHandle ← mapID (fileID)

OperationCode: 0x1008
OperationParameter1: ptpObjectHandle
OperationParameter2: None
OperationParameter3: None
```

FIG. 14C
```
fileType ← ObjectFormat FIELD OF
           OBJECT INFORMATION DATA SET
fileSize ← ObjectCompressedSize FIELD OF
           OBJECT INFORMATION DATA SET
```

FIG. 14D
```
<?xml version="1.0"?>
<dps xmlns="http://www.xxxx">
    <opResult>
        XX000000
    </opResult>
    <getFileInfoResponse>
        <fileType>04000000</fileType>
        <fileSize>1048576</fileSize>
    </getFileInfoResponse>
</dps>
```

FIG. 15

| OBJECT INFORMATION DATA SET | |
|---|---|
| StorageID | 0001h |
| ObjectFormat | 3002h |
| ProtectionStatus | 0000h |
| ObjectCompressedSize | SIZE OF (INPUT OR OUTPUT) |
| ThumbFormat | 0000h |
| ThumbCompressedSize | 00000000h |
| ThumbPixWidth | 00000000h |
| ThumbPixHeight | 00000000h |
| ImagePixWidth | 00000000h |
| ImagePixHeight | 00000000h |
| ImageBitDepth | 00000000h |
| ParentObject | "IMAGE" |
| ASSOSIATION TYPE | 0000h |
| ASSOCIATION DESC | 00000000h |
| SequenceNumber | 00000000h |
| Filename | 001. JPG |
| CaptureDate | 2003/11/01 |
| ModificationDate | 2003/11/01 |
| Keywords | "TEST" |

FIG. 16A
```
<?xml version="1.0"?>
<dps xmlns="http://www.xxxx">
    <GetFileRequest>
        <fileID>00000001</fileID>
        <buffPtr>00000001</buffPtr>
    </GetFileRequest>
</dps>
```

FIG. 16B  ptpObjectHandle ← mapID (fileID)

FIG. 16C
```
OperationCode: 0x1009
OperationParameter1: ptpObjectHandle
OperationParameter2: None
OperationParameter3: None
```

FIG. 16D
```
<?xml version="1.0"?>
<dps xmlns="http://www.xxxx">
    <opResult>
        XX000000
    </opResult>
    <GetFileResponse>
        <fileSize>1058576</fileSize>
    </GetFileResponse>
</dps>
```

FIG. 17A
```
<?xml version="1.0"?>
<dps xmlns="http://www.xxxx">
    <GetFileListRequest>
        <fileType>04000000</fileType>
        <ParentObject>00000001</ParentObject>
    </GetFileListRequest>
</dps>
```

FIG. 17B  ObjectFormatCode ← ObjectFormatID (fileType)

FIG. 17C
```
OperationCode: 0x1007
OperationParameter1: StorageID
OperationParameter2: [ObjectFormatCode]
OperationParameter3: ObjectHandle OF FOLDER, ETC.
                     REQUESTING CHILD OBJECT LIST
```

FIG. 17D
```
<?xml version="1.0"?>
<dps xmlns="http://www.xxxx">
    <GetFileResponse>
        <imageIDs>00000001 00000002 00000003</imageIDs>
        <numIDs>3</numIDs>
    <getFileResponse>
    <opResult>
        XX000000
    </opResult>
</dps>
```

FIG. 18A (IMAGE OUTPUT DEVICE 1 → XML COMMAND → IMAGE SUPPLY DEVICE 2)

- ObjectCompressedSize FIELD OF OBJECT INFORMATION DATA SET ← SIZE OF (XML COMMAND)
- SendObjectInfo (OBJECT INFORMATION DATA SET)
- RESPONSE
- SendObject (XML COMMAND)
- RESPONSE

FIG. 18B (IMAGE OUTPUT DEVICE 1 → XML COMMAND → IMAGE SUPPLY DEVICE 2)

- ObjectCompressedSize FIELD OF OBJECT INFORMATION DATA SET ← SIZE OF (XML RESPONSE)
- RequestObjectTransfer (ObjectHandle)
- GetObjectInfo (ObjectHandle)
- OBJECT INFORMATION DATA SET
- GetObject (ObjectHandle)
- XML RESPONSE

IMAGE PROCESSING METHOD AND IMAGE PROCESSING SYSTEM USING THE SAME

BACKGROUND OF THE INVENTION

The present invention relates to an image processing system and an image processing method, wherein control information and image data files are transmitted over a communication path, and images based on the image data files which are stored in an image supply device, are output by way of an image output device.

Japanese Patent Publication No. 2002-330394A discloses a so called direct print system, wherein a digital still camera is connected to a printer without involvement of a personal computer or the like, and images captured by the digital still camera are printed by the printer.

In the direct print system, image data, a print job start command, and the like are exchanged between the digital still camera and the printer through use of a protocol unique to a vendor.

However, since each vendor uses its own protocol, images captured by a digital still camera can be printed by a printer of a certain vendor but may not be printed by a printer of another vendor.

In such a case, if a single image output control protocol is newly used by a plurality of vendors, images captured by a digital still camera could be printed by a printer of any of the vendors. However, such a protocol is formed at a level higher than a lower-level layer using an existing protocol. For this reason, there arises a problem of an increase in communication overhead.

SUMMARY OF THE INVENTION

It is therefore an object of the invention to provide an image processing method capable of suppressing communication overhead, which would arise at the time of use of an image output control protocol for transmitting control information as text data. It is also an object of the invention to provide an image processing system using such a method.

In order to achieve the above object, according to the invention, there is provided an image processing method, performed by an image supply device storing image data and an image output device performing image processing with respect to the image data, which are connected via a communication path through which the image data is communicated, the method comprising steps of:

selecting, at one of the image supply device and the image output device, one of a text command described by a markup language and a binary command described by a binary, as a command including a control information item for the image processing;

transmitting, from one of the image supply device and the image output device to the other, the selected one of the text command and the binary command; and performing, at the other one of the image supply device and the image output device, processing specified by the control information included in the selected one of the text command and the binary command.

In such a configuration, a portion of communication performed by a control protocol to be used for transmitting control information as text data can be switched to communication using a binary command of another protocol. Hence, communication overhead, which arises when the control protocol is used, can be suppressed.

Preferably, the image processing method further comprises a step of judging whether the control information item can be described by the binary. Here, the selecting step is performed so as to select the binary command in a case where it is judged that the control information item can be described by the binary.

Preferably, the image processing method further comprises steps of:

transmitting, to the one of the image supply device and the image output device from the other one, text data including a response indicating a result of the step of performing the processing, in a case where the text command is selected in the selecting step; and transmitting, to the one of the image supply device and the image output device from the other one, binary data including a response indicating a result of the step of performing the processing, in a case where the binary command is selected in the selecting step.

Preferably, the text command is a command specified by a first protocol, and the binary command is a command specified by a second protocol which is a lower hierarchical protocol than the first protocol.

In such a configuration, since a protocol of a lower hierarchical level is used, there is obviated a necessity for placing another protocol using a binary command at the same level as that of the control protocol. In such a configuration, circuits and program codes used for executing processing operations can be made compact.

Here, it is preferable that the text command is transmitted as a file by a file transmission command which is specified by the second protocol.

Preferably, the selecting step is performed in accordance with a kind of a command issued by an application which is available in at least one of the image supply device and the image output device.

Preferably, the selecting step is performed in accordance with a kind of the application which issues a command with respect to at least one of the image supply device and the image output device.

In such a configuration, when a binary command can be used, a binary command can be directly used without generation of a text command.

According to the invention, there is also provided an image processing system, comprising:

an image supply device, operable to store image data; and an image output device, connected to the image supply device via a communication path through which the image data is communicated, and operable to perform image processing with respect to the image data, wherein at least one of the image supply device and the image output device comprises:

a binary transmitter, which transmits a binary command described by a binary;

a text transmitter, which transmits a text command, which is described by a markup language, as a file specified by a file transmission command which is one of binary commands; and a controller, operable to judge whether a command including a control information item for the image processing to be performed can be described by the binary; operable to control the binary transmitter to transmit the command as the binary command in a case where it is judged that the command can be described by the binary; and operable to control the text transmitter to transmit the command as the text command in a case where it is judged that the command cannot be described by the binary; and wherein at least the other one of the image supply device and the image output device comprises:

a binary receiver, which receives the transmitted binary command;

a text receiver, which receives the transmitted text command;

a binary executor, which executes processing specified by the control information item included in the received binary command; and a text executor, which executes processing specified by the control information item included in the received text command.

According to the invention, there is also provided an image output device, connected to an image supply device storing image data via a communication path through which the image data is communicated, the image output device comprising:

a binary transmitter, which transmits a binary command described by a binary;

a text transmitter, which transmits a text command, which is described by a markup language, as a file specified by a file transmission command which is one of binary commands; and a controller, operable to judge whether a command including a control information item for image processing to be performed can be described by the binary; operable to control the binary transmitter to transmit the command as the binary command in a case where it is judged that the command can be described by the binary; and operable to control the text transmitter to transmit the command as the text command in a case where it is judged that the command cannot be described by the binary.

According to the invention, there is also provided an image supply device, connected to an image output device performing image processing via a communication path, the image supply device comprising:

a storage, which stores image data to be transmitted through the communication path and subjected to the image processing;

a binary receiver, which receives a binary command described by a binary and transmitted from the image output device;

a text receiver, which receives a text command described by a markup language and transmitted from the image output device;

a binary executor, which executes processing specified by a control information item for the image processing which is included in the received binary command; and a text executor, which executes processing specified by a control information item for the image processing which is included in the received text command.

According to the invention, there is also provided a computer program product comprising a computer program which causes a computer to serve as the binary transmitter, the text transmitter, and the controller in the above image output device.

According to the invention, there is also provided a computer program product comprising a computer program which causes a computer to serve as the binary receiver, the text receiver, the binary executor, and the text executor in the above image supply device.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a view showing an example protocol used between an image output device and an image supply device in the image output system of the first embodiment;

FIG. 3 is a list showing exemplary XML commands communicated between the image supply device and the image output device in the image output system of the first embodiment;

FIG. 10 is a view showing an example XML script for an image output job start command employed in the first embodiment;

FIG. 11 is a view showing an example XML script for a file acquisition command employed in the first embodiment;

FIG. 12 is a view showing an example command exchanged between the image output device and the image supply device and example flow of a response to the command within the image output system of the first embodiment;

FIG. 14A is a view showing an example XML command which is a text command;

FIG. 14B is a view showing generation of an object handle corresponding to a file ID;

FIG. 14C is a view showing an example PTP command which is a binary command;

FIG. 14D is a view showing reading of a file type and a file size from an object information data set;

FIG. 14E is an example response to the XML command which is text data;

FIG. 15 is a view showing an object information data set transmitted from the image supply device to the image output device within the image output system of the first embodiment;

FIG. 16A is a view showing another example XML command which is a text command;

FIG. 16B is a view showing generation of an object handle corresponding to a file ID;

FIG. 16C is a view showing another example PTP command which is a binary command;

FIG. 16D is a view showing another example response to the XML command which is text data;

FIG. 17A is a view showing yet another example XML command which is a text command;

FIG. 17B is a view showing generation of an object format code corresponding to a file type;

FIG. 17C is a view showing yet another example PTP command which is a binary command;

FIG. 17D is a view showing yet another example response to the XML command which is text data;

FIG. 18A is a view showing flow of processing to be performed when the XML command is transmitted from the image supply device to the image output device as data, within the image output system of the first embodiment;

FIG. 18B is a view showing flow of processing performed when an XML response is transmitted as data from the image supply device to the image output device in the image output system of the first embodiment;

DETAILED DESCRIPTION OF THE INVENTION

Preferred embodiments of the invention will be described hereinbelow with reference to the accompanying drawings.

Figure 1:
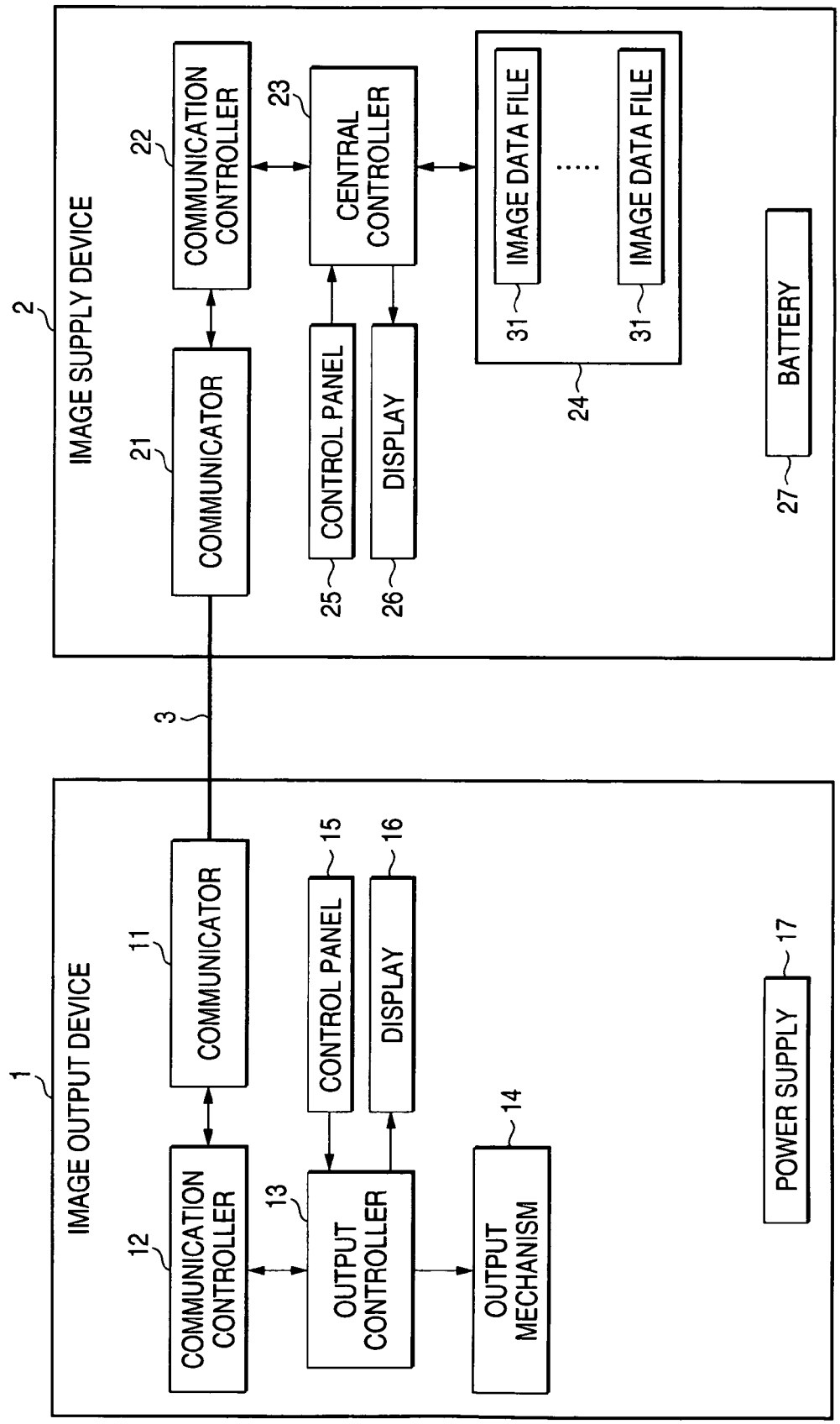
FIG. 1 is a block diagram showing the configuration of an image output system according to a first embodiment of the invention.

FIG. 1 shows an image output system according to a first embodiment of the invention. This image output system can be taken as one type of so-called direct print system. In this embodiment, an image output device 1 is a device for outputting images on the basis of image data. The image output device 1 is embodied in the form of a printer or the like which prints images on paper on the basis of image data. An image supply device 2 is a device capable of storing image data and transmitting image data as required. The image supply device 2 is embodied in the form of a digital still camera or the like which stores captured images on a predetermined storage medium as image data.

A communication path 3 is a transmission medium for connecting the image output device 1 to the image supply device 2. The communication path 3 is not limited to a cable communication path, and a wireless communication path may also be employed. In the first embodiment, a universal serial bus (USB) cable is used as the communication path 3. In a case where the communication path 3 is a cable communication path, an unillustrated connector is provided on the image output device 1 and the image supply device 2, thereby connecting connectors provided on respective ends of the cable of the communication path 3 to connectors of the devices 1 and 2.

In the image output device 1 shown in FIG. 1, a communicator 11 is a circuit for communicating various information items as electrical signals via the communication path 3. A communication controller 12 is a circuit or device which controls the communicator 11 to exchange information with a mating device in accordance with various protocols. The communicator 11 and the communication controller 12 exchange, by way of the communication path 3, control information pertaining to an image output as a series of scripts described in markup languages.

An output controller 13 is a circuit or device which controls and monitors an output mechanism 14, thereby controlling image output processing (i.e., print processing in a case where the image output device 1 is a printer). In the first embodiment, the output controller 13 controls a processing flow pertaining to an image output. The output mechanism 14 is a mechanical and/or electrical constitution section for outputting images. In the case of a printer, the output mechanism 14 corresponds to a print mechanism and a paper feed mechanism. The output controller 13 and the output mechanism 14 output an image on the basis of image data.

A control panel 15 is a circuit or device which is to be manipulated by the user and outputs a signal in response to manipulation. Various switches or a touch panel is used as the control panel 15, as required. A display 16 is a device for display various information items. Various indicators or a liquid-crystal display is used as the display 16, as required.

A power supply 17 is a circuit which is connected to commercial power or an AC/DC converter and feeds supplied power to internal circuits.

In the image supply device 2 shown in FIG. 1, a communicator 21 is a circuit which exchanges various information items in the form of electrical signals by way of the communication path 3. A communication controller 22. is a circuit or device which controls the communicator 21 to exchange information with a mating device in accordance with various protocols. The communicator 21 and the communication controller 22 exchange, by way of the communication path 3, control information pertaining to an image output as a series of scripts described in markup languages.

A central controller 23 is a circuit or device which performs various processing operations while exchanging various information items with circuits or devices having various functions, such as the communication controller 22 and a storage medium 24.

The storage medium 24 is a device which stores at least one image data file 31. The image data file 31 is a file which includes image data pertaining to, e.g., images captured by a digital camera, or other images. The format of the image data is, e.g., a JPEG (Joint Photographic Experts Group) format or an EXIF (Exchangeable Image File) format.

Semiconductor memory, a memory card using semiconductor memory, a magnetic storage medium, an optical storage medium, or an electr-optical storage medium is used as the storage medium 24. The storage medium may be fixed or removably attached to the image supply device 2.

A control panel 25 is a circuit or device which is to be manipulated by the user and outputs a signal in response to manipulation. Various switches or a touch panel is used as the control panel 25, as required. A display 26 is a device for display various information items, such as images based on image data. Various indicators or a liquid-crystal display is used as the display 26, as required.

A battery 27 supplies power to internal circuits of the image supply device 2. A storage battery or a disposable battery is used as the battery 27. When the image supply device 2 is a device requiring portability, the battery 27 is provided as a power source. When the image supply device 2 is a device which does not require portability, a power supply as well as the power supply 17 of the image output device 1, may be provided as a power source.

FIG. 2 shows an example protocol used between the image output device 1 and the image supply device 2.

As shown in FIG. 2, in the first embodiment, the communication path 3; that is, a USB cable, is used as a physical layer. In the image output device 1 and the image supply device 2, both pertaining to the first embodiment, a USB layer is adopted as a layer for controlling the physical layer. A still image capture device class (SIC) is used as a USB class. As a result, a data transmission path is realized. In relation to the USB standards, USB 1.1 and USB 2.0 are currently in use.

However, the next version or subsequent versions, which would be proposed in future, may also be used, or a communication standard equivalent to the USB may also be used instead. When a USB is used for the communication path 3, the image output device 1 serves as a host, and the image supply device 2 serves as a device.

A picture transfer protocol (PTP) is used at a higher level for specifying control of a digital still picture device (DSPD) from the outside or transfer of image data to the outside of the digital still picture device (DSPD). "PIMA15740:2000" proposed by Photographic and Imaging Manufacturers Association, Inc is available as a set of PTP standards. Here, PTP is a protocol which offers a communications system for exchanging image data between DSPDs. In relation to the PTP, an object (e.g., an image data file) stored in a storage is specified not by a path but by an object ID (i.e., an object handle).

In the first embodiment, a direct print service (hereinafter abbreviated as "DPS") protocol is used at a higher level of the PTP for supplying image data stored in the image supply device 2, such as a digital camera, directly to the image output device 1, such as a printer, by way of the communication path 3, to thereby perform printing operation. In relation to the DPS protocol, control information about an image output is exchanged as a series of scripts described in an markup language (here, XML: Extensible Markup Language) between the image output device 1 and the image supply device 2 by way of the communication path 3.

Control information pertaining to an image output includes various commands pertaining to image output processing, respons s to the commands, and notification of statuses of devices. The script includes only control information and does not include any image data which are objects of image output operation. Specifically, the script includes information about a location for storing image data files, but does not include image data.

FIG. 3 shows exemplary commands (hereinafter denoted as "XML commands") based on various XML scripts used for image output processing.

DPS_DiscoverService is an XML command to be transmitted by the image output device 1 for determining whether or not the image supply device 2 connected by way of the communication path 3 corresponds to the DPS protocol. DPS_Configure is an XML command to be transmitted by the image output device 1 for determining the level of correspondence of DPS of the image supply device 2 connected by way of the communication path 3.

DPS_GetCapability is an XML command transmitted by the image supply device 2 for determining the nature of an output which can be output by the image output device 1 connected by way of the communication path 3. DPS_GetJobStatus is an XML command transmitted by the image supply device 2 for determining which job is being executed by the image output device 1 connected by way of the communication path 3. DPS_GetServiceStatus is an XML command transmitted by the image supply device 2 for determining the condition of the image output device 1 connected by way of the communication path 3.

DPS_GetObjectID is an XML command transmitted by the image output device 1 for acquiring an object ID of the object file stored in the image supply device 2 connected by way of the communication path 3. "DPS_GetFileInfo" is an XML command transmitted by the image output device 1 for acquiring a file size and a file type of an object file stored in the image supply device 2 connected by way of the communication path 3. "DPS_GetFile" is an XML command transmitted by the image output device 1 for acquiring an object file stored in the image supply device 2 connected by way of the communication path 3. "DPS_GetPartialFile" is an XML command transmitted by the image output device 1 for acquiring a portion of the object file stored in the image supply device 2 connected by way of the communication path 3.

"DPS_GetFileList" is an XML command transmitted by the image output device 1 for acquiring an object ID of the object file stored in the image supply device 2 connected by way of the communication path 3. "DPS_GetThumb" is an XML command transmitted by the image output device 1 for acquiring a thumbnail file of the image data stored in the image supply device 2 connected by way of the communication path 3.

DPS_StartJob is an XML command transmitted by the image supply device 2 for initializing and starting a print job of in the image output device 1 connected by way of the communication path 3. DPS_AbortJob is an XML command transmitted by the image supply device 2 for aborting the print job of in the image output device 1 connected by way of the communication path 3. DPSContinueJob is an XML command transmitted by the image supply device 2 for resuming the print job of in the image output device 1 connected by way of the communication path 3.

These commands are control information to be used for transmitting an image data file from the image supply device 2 to the image output device 1 and printing an image. Particularly, the "DPS_GetFile" or "DPS_GetPartialFile" command is a command indispensable for the image output device 1 to acquire an image data file 31 which is present in the image supply device 2.

The "DPS_GetFileList", "DPS_GetThumb", and "DPS_GetFileInfo" commands are commands indispensable for the image output device 1 to ascertain existence of the image data file 31 in the image supply device 2 and acquiring the image data file 31 without fail. The size of the image data file 31 produced through acquiring operation of a digital camera ranges from hundreds of kilo bytes to tens of megabytes. A further increase in the size of the image data file due to an increase in picture quality is predicted. Therefore, ascertainment of the image supply device 2 that is not under direct control with regard to the size of the image data file 31 to be received is very important. If an attempt is made to receive the image data file 31, which is greater in size than a buffer, without ascertaining the size of the image data file, receipt of the image data file 31 cannot be completed. Consequently, the image output device 1 becomes unable to execute the next control operation.

Each of the XML commands is constituted of a text XML script. A data transfer protocol to be used for exchanging the script is required at a lower-level layer of DPS. In the first embodiment, PTP is used as a low-level protocol. In some cases, the data transfer protocols include not only a mere protocol for data transmission, but also a command for file acquisition or the like. For instance, commands having the same functions as those of the XML commands, such as the "DPS_GetFile", "DPS_GetPartialFile", "DPS_GetFileList", "DPS_GetThumb", and "DPS_GetFileInfo" commands, are prepared as PTP.

A low-level layer of the DPS protocol is not limit d to the PTP. Therefore, a wrapper layer is provided between the DPS protocol and a low-level layer (here a PTP) for achieving consistency between the DPS protocol and low-level layers of a plurality of types.

In the first embodiment, among the previously-described protocols, the physical layer is embodied by the communicator 11, the communication channel 3, and the communicator 21. The USB layer is embodied by the communicator 11 and the communicator 21. The PTP layer, the wrapper layer, and the DPS protocol layer are realized by the communication controller 12 and the communication controller 22.

Specifically, each of the communication controllers 12, 22 serves as a first entity for interpreting a DPS protocol, which is an image output control protocol to be used for exchanging control information pertaining to image output described in markup languages; a second entity for interpreting a PTP, which is an image data file management protocol located at a level lower than the first entity, and used for managing the image data stored in the image supply device 2 and transferring the image data to the image output device 1; and a third entity which is located at a level lower than the second entity for controlling a physical layer of the communication channel 3. Here, the term "entity" refers to a substance for realizing a communications function relating to a certain protocol.

The wrapper layers in the respective communication controllers 12, 22 effect a protocol conversion between an image output control protocol and an image data file management protocol of the first entity, both protocols being suitable for the type of the image data file management protocol of the second entity.

Namely, the wrapper layers of the respective communication controllers 12, 22 replace a high-level protocol (DPS protocol) command with a low-level protocol (PTP) command, as required.

Figure 4:
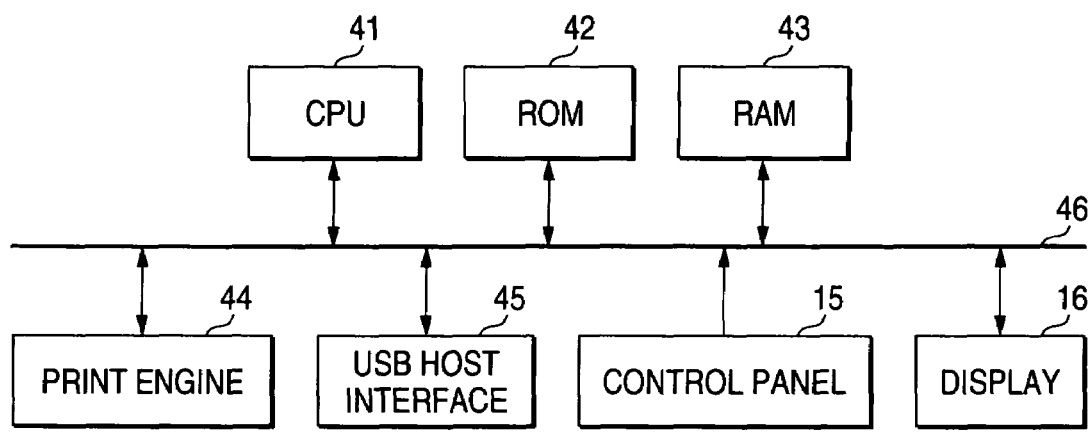
FIG. 4 is a block diagram showing an exemplary configuration of a printer serving as the image output device in the image output system of the first embodiment.

FIG. 4 shows an example configuration of a printer serving as the image output device 1. In the printer, a CPU 41 is a device which executes a program, to thereby perform processing described in the program. A ROM 42 is a memory which stores programs and data in advance. A RAM 43 is a memory which temporarily stores a program and data when executing the program.

A program to be used for producing print control data from image data and a program for effecting communication in accordance with a DPS protocol and an image transfer protocol are stored, as programs to be executed by the CPU 41, in the ROM 42 or another unillustrated storage medium.

A print engine 44 is a circuit or device which controls the output mechanism 14, to thereby perform print processing in accordance with the print control data supplied from the CPU 41.

A USB host interface 45 corresponds to the communicator 11 shown in FIG. 1 and is a host interface circuit which is specified by the USB.

A bus 46 is a signal channel for interconnecting the CPU 41, the ROM 42, the RAM 43, the print engine 44, the USB host interface 45, the control panel 15, and the display 16. The number of buses 46 and a topology of connection of the CPU 41 and the print engine 44 to the bus 46 are not limited to those shown in FIG. 4.

The control panel 15 and the display 16, which are shown in FIG. 4, are analogous to those shown in FIG. 1.

Figure 5:
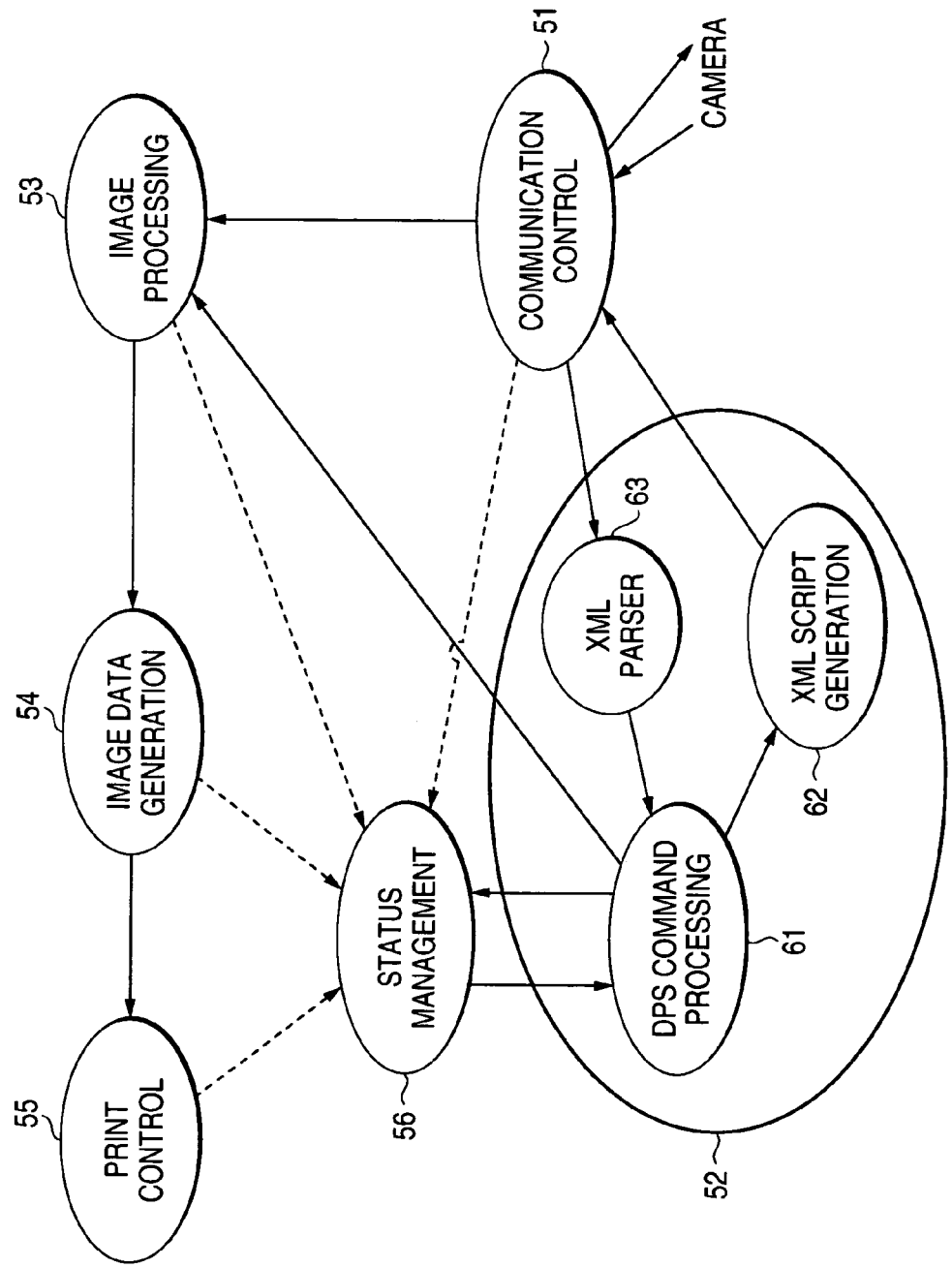
FIG. 5 is a view showing relationships among a plurality of functions of the image output device in the image output system of the first embodiment.

FIG. 5 shows relationships between a plurality of functions of the image output device 1. A communication control function 51 is a function for effecting communication control under an image transfer protocol.

A DPS protocol processing function 52 includes a DPS command processing function 61, which produces and interprets control information specified by the DPS protocol; an XML script generating function 62, which produces an XML script corresponding to the control information; and an XML server 63, which subjects to syntax analysis the control information described in an XML.

The XML server 63 may be designed to enable analysis of all syntaxes in an XML or analysis of only syntaxes used in the DPS protocol. In such a case, the only requirement for the XML server 63 is to be able to discern only a tag required to describe an XML script related to the DPS protocol.

The XML script generating function 62 may be set so as to previously store templates of XML scripts in the ROM 42 according to the types of control information items, such as commands, and to generate an XML script showing control information by editing the template.

An image processing function 53 is a function for changing the format of image data. A print data generating function 54 is a function for generating print control data from image data whose format has been changed. A print control function 55 is a function for performing print processing in accordance with the print control data.

A status management function 56 is a function for monitoring processing statuses of the previously-described respective functions. The functions are realized by the CPU 41 executing the program.

Figure 6:
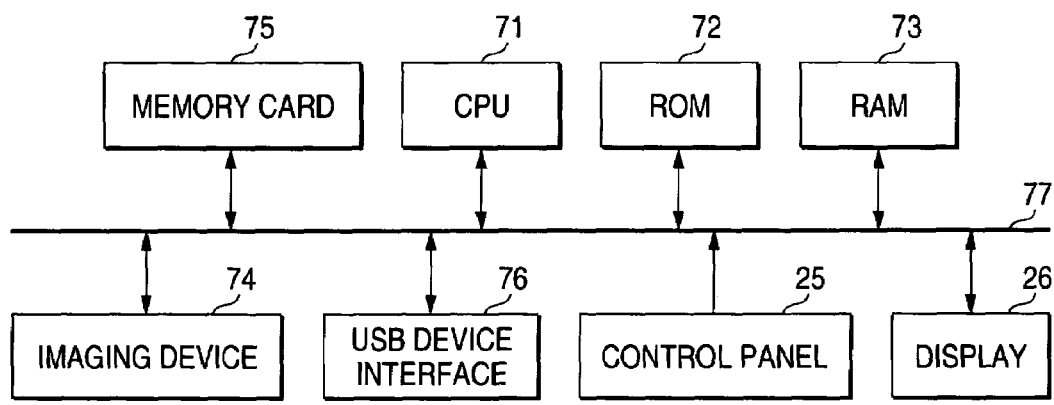
FIG. 6 is a block diagram showing an exemplary configuration of a digital camera serving as the image supply device in the image output system of the first embodiment.

FIG. 6 shows an example configuration of a digital camera serving as the image supply device 2. In the digital camera, a CPU 71 is a device which executes a program, to thereby perform processing described by the program. A ROM 72 is a memory for storing programs and data in advance. A RAM 73 is a memory for temporarily storing a program and data when executing the program.

A program to be used for controlling individual sections during photographing operation and a program for effecting communication and management of image data in accordance with a DPS protocol, a protocol conversion program of the wrapper layer and an image transfer protocol are stored, as programs to be executed by the CPU 71, in the ROM 72 or another unillustrated storage medium.

An imaging device 74 images a subject in accordance with a command from the CPU 71 and stores obtained image data into a memory card 75.

The memory card 75 corresponds to the storage medium 24 shown in FIG. 1 and is a storage medium for storing image data obtained through imaging. Semiconductor memory or a magnetic recording device, which is fixed in a device, may be used in place of the memory card 75.

A USB device interface 76 corresponds to the communicator 21 shown in FIG. 1 and is a device interface circuit specified by the USB.

A bus 77 is a signal channel for interconnecting the CPU 71, the ROM 72, the RAM 73, the imaging device 74, the memory card 75, the USB device interface 76, the control panel 25, and the display 26. The number of buses 77 and the topology of connection of the CPU 71 to the bus 77 are not necessarily limited to those shown in FIG. 5.

The control panel 25 and the display 26, which are shown in FIG. 5, are analogous to those shown in FIG. 1.

Figure 7:
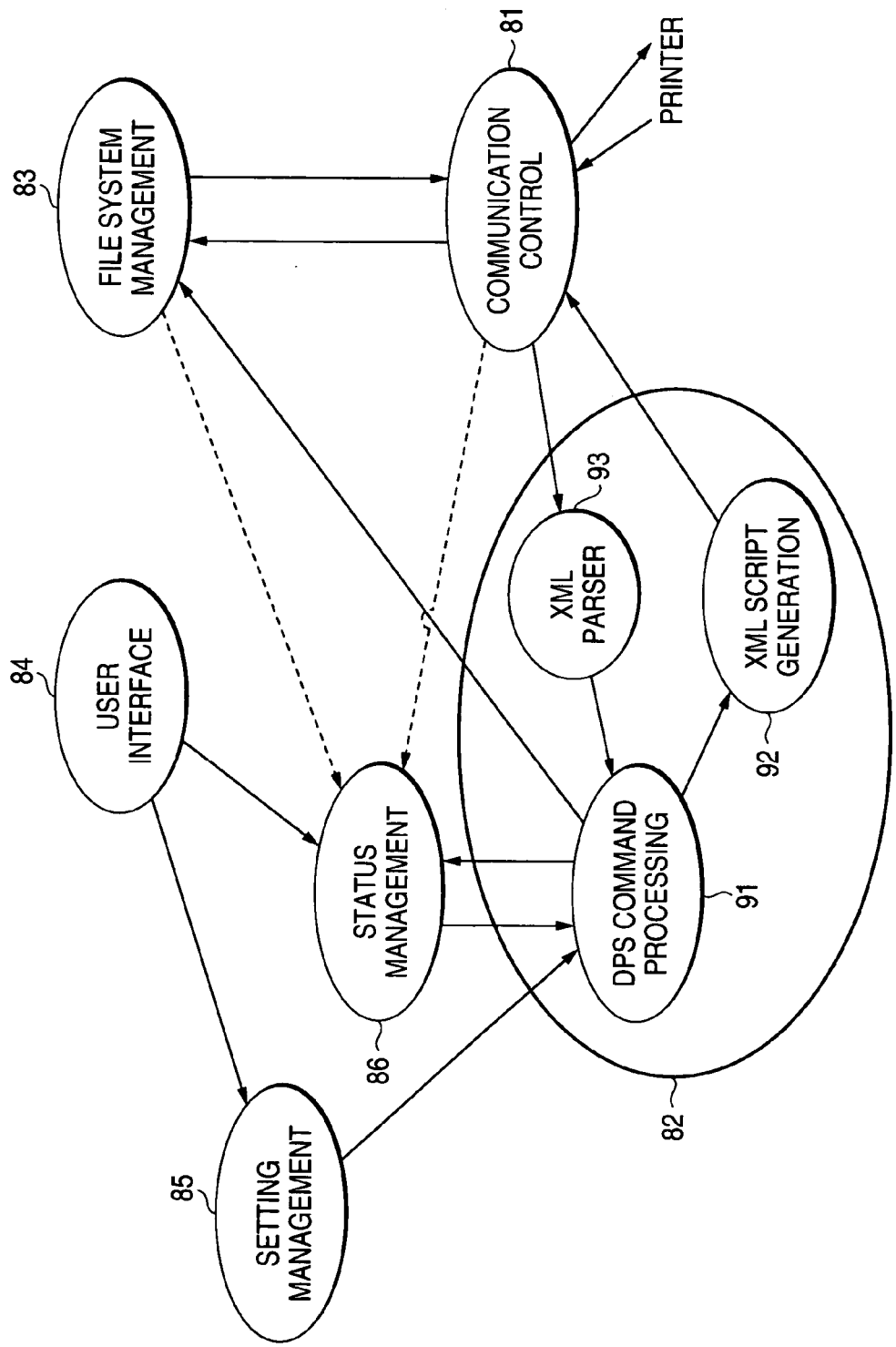
FIG. 7 is a view showing relationships among a plurality of functions of the image supply device in the image output system of the first embodiment.

FIG. 7 shows relationships between a plurality of functions of the image supply device 2. A communication control function 81 is a function for effecting communication control under an image transfer protocol.

A DPS protocol processing function 82 includes a DPS command processing function 91, which produces and interprets control information specified by the DPS protocol; an XML script generating function 92, which produces an XML script corresponding to the control information; and an XML server 93, which subjects to syntax analysis the control information described in an XML.

The XML server 93 may be designed to enable analysis of all syntaxes in an XML or analysis of only syntaxes used in the DPS protocol. In such a case, the only requirement for the XML server 93 is to be able to discern only a tag required to describe an XML script related to the DPS protocol.

The XML script generating function 92 may be set so as to previously store templates of XML scripts in the ROM 72 according to the types of control information items, such as commands, and to generate an XML script showing control information by editing the template.

A file system management function 83 is a function which stores image data as an image data file 31 in the memory card 75 serving as the storage medium 24, in accordance with a predetermined directory structure and a file structure.

A user interface function 84 is a function for accepting operation of the control panel 25 performed by the user and displaying various information items on the display 26.

A setting management function 85 is a function for setting requirements, such as print processing, in accordance with the user's operation. A status management function 86 is 2 function for monitoring processing statuses of the aforementioned functions. These functions are realized by the CPU 71 executing the program.

Figure 8:
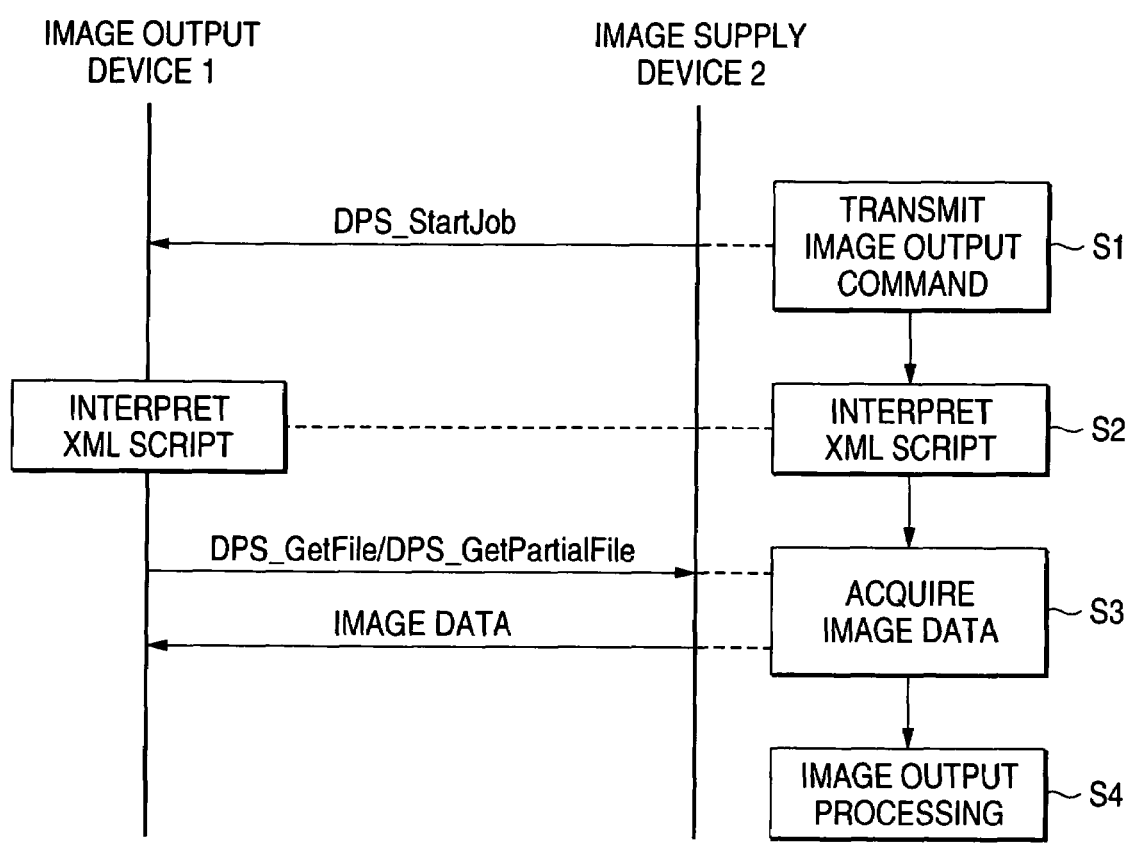
FIG. 8 is a view for describing image output processing on the DPS protocol level in the image output system of the first embodiment.
Figure 9:
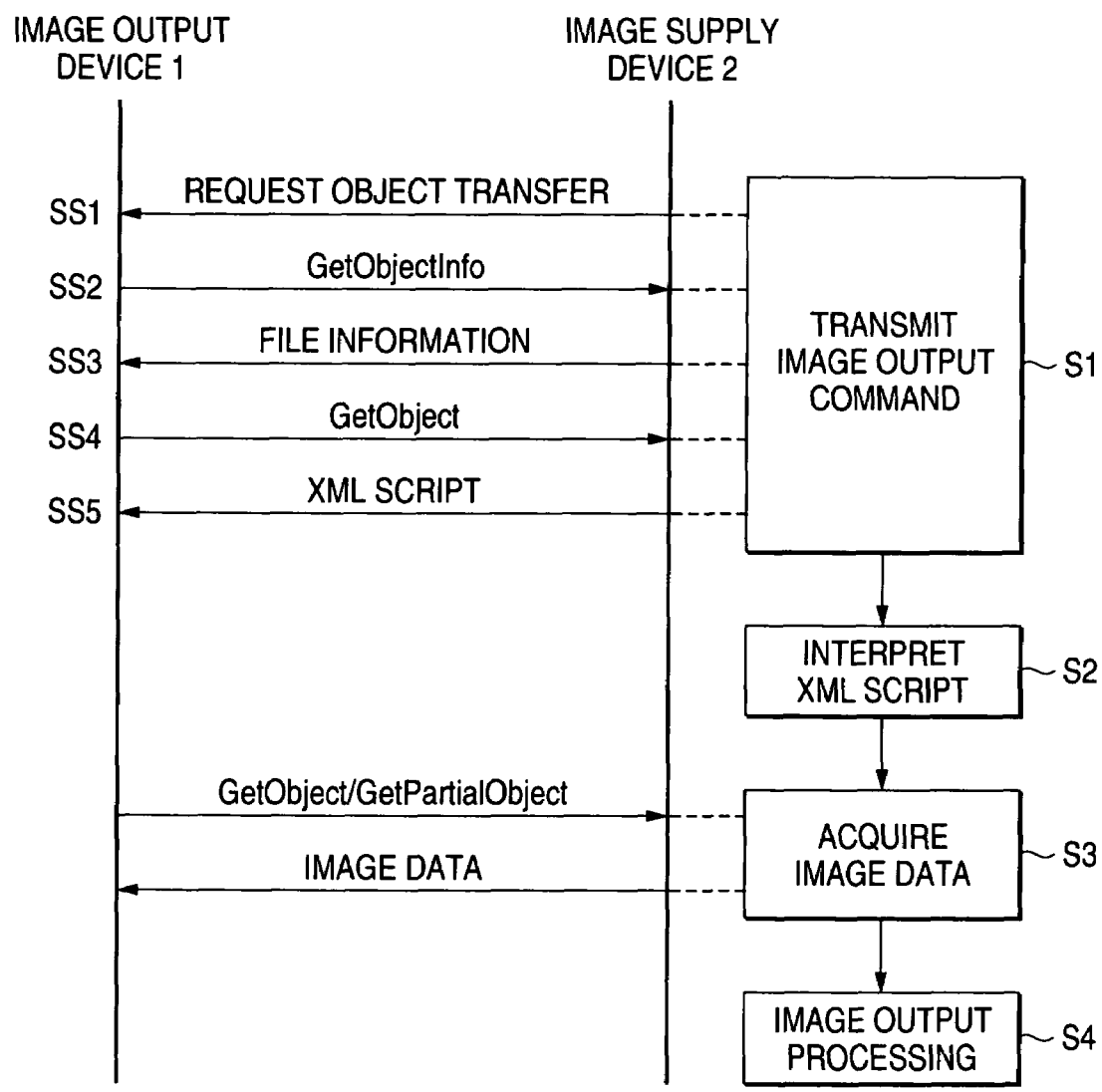
FIG. 9 is a view for describing image output processing on the image transfer protocol level in the image output system of the first embodiment.

Operations of the individual devices in the system will now be described. FIG. 8 shows image output processing at the DPS protocol level. FIG. 9 shows image output processing at the image transfer protocol level.

First, when a predetermined operation has been performed by way of, e.g., the control panel 25, the image supply device 2 transmits an image output job start command to the image output device 1 by way of the communication channel 3 (step S1).

At that time, in the image supply device 2, the communication controller 22 produces and transmits an XML script of an image output job start command "DPS_StartJob" in accordance with the DPS protocol. Here, image data which are objects of image output are specified within the XML script.

The image output job start command "DPS_StartJob" includes the next job requirement setting information and image output information.

As required, the job requirement setting information include quality information for setting the quality of an image output pertaining to a current job, paper type information pertaining to a current print job, paper size information pertaining to a current print job, image format information, image optimization setting information, and page layout information.

As required, the image input information include cropping area information for specifying an area required when cropping operation is performed, an object ID of image data, copy number information pertaining to each image, a job ID unique to each job, path information pertaining to image data or a job specification file, and repeated supply count information pertaining to each image data (i.e., information showing the number of times identical image data are consecutively supplied to the image output device 1).

FIG. 10 shows an example XML script of an image output job start command "DPS_StartJob". A job tag is a tag to be used for specifying one job. Here, when a reference is made to an XX tag, the tag designates both a <XX> tag and a </XX> tag (the same also applies to any counterparts in the following descriptions). A jobConfig tag and a printInfo tag are arranged below the job tag. The jobConfig tag is for specifying job requirement setting information.

In the script shown in FIG. 10, a quality tag, a paperSize tag, a paperType tag, a fileType tag, a date tag, a filename tag, an imageOptimize tag, and a layoutItem tag are arranged below the jobConfig tag.

The quality tag is for specifying quality information, such as a standard, a draft, or a fine. The paperSize tag is for specifying paper size information pertaining to a current job, such as an A4-size. A paper size is specified by a predetermined numeral (e.g., 02010000). The paperType tag is for specifying paper type information pertaining to a current job, such as standard paper or photographic paper. The paper size is specified by a predetermined numeral (e.g., 03020000). The fileType tag is for specifying image format information pertaining to a current job, such as EXIF, JPEG, TIFF, and GIF, and an image format is specified by a predetermined numeral (e.g., 04150000).

The date tag is for specifying whether or not date information specified by a printInfo tag is to be printed. The fileName tag is for specifying whether or not the file path information specified by the printInfo tag is to be printed. The imageOptimize tag is for specifying image optimization setting information showing whether or not image optimization is to be effected. The layoutItem tag is for specifying a page layout of a current job. An image format is specified by a predetermined numeral (e.g., 08010000).

The printInfo tag is for specifying image output information. An image tag is arranged at a position lower than the printInfo tag. The image tag is for specifying an image which is an object of image output In the script shown in FIG. 10, an imageID tag and an imageDate tag are arranged at a position lower than the image tag. The imageID tag is for specifying an object ID of image data which are objects of image output. The imageDate tag is for designating a date to be printed beside an image.

The script shown in FIG. 10 includes only one image tag. However, in a case where a plurality of images are to be output, an image data object ID is specified for each of the plurality of images by the image tag. When a single image is to be output repetitively a plurality of times, a copies tag is arranged subsequent to an image tag of the image, whereby the number of times feeding operation to be repeated is specified.

A dps tag shown in FIG. 10 is a tag which shows an XML script pertaining to a DPS and takes, as an attribute, an URL (Uniform Resource Locator) which is a location at which name space information to be used for DPS is stored.

Logically, the communication controller 22 of the image supply device 2 transmits the XML script of the job start command in accordance with a DPS protocol. However, the communication controller 22 converts, at the wrapper layer, an XML command described by the XML script into a command of an image transfer protocol (hereinafter, referred as a PTP command), so that processes that command on the image transfer protocol level.

Specifically, the communication controller 22 of the image supply device 2 first transmits a file transfer request command "RequestObjectTransfer" (step SS1) in accordance with the image transfer protocol. The command is transmitted to the image output device 1 by way of the USB layer and the physical layer.

In the image output device 1, the communication controller 12 transmits a command "GetObjectInfo" for inquiring an attribute of a file to be transferred upon receipt of the file transfer request command "RequestObjectTransfer" in accordance with the image transfer protocol (step SS2). The command is transmitted to the image supply device 2 by way of the USB layer and the physical layer.

In the image supply device 2, the communication controller 22 transmits file information about an XML script of a command "DPS_StartJob" (a file format, a file volume, or the like) upon receipt of a command "GetObjectInfo" in accordance with the image transfer protocol (step SS3). The file information is transmitted to the image output device 1 by way of the USB layer and the physical layer.

In the image output device 1, the communication controller 12 specifies the XML script upon receipt of the file information in accordance with the image transfer protocol, thereby transmitting a file acquisition command "GetObject" (step S4). The file information is transmitted to the image supply device 2 by way of the USB layer and the physical layer.

In the image supply device 2, the communication controller 22 transmits a specified file (an XML script of a command "DPS_StartJob") upon receipt of the command "GetObject" in accordance with the image transfer protocol (step SS5). The file is transmitted to the image output device 1 by way of the USB layer and the physical layer.

In the image output device 1, the communication controller 12 receives the file in accordance with the image transfer protocol, thereby receiving the command "DPS_StartJob" at a DPS protocol layer.

Here, the image output device 1 is a printer shown in FIGS. 4 and 5. In a case where the image supply device 2 is a digital camera shown in FIGS. 6 and 7, communication under a DPS protocol is effected by the DPS protocol processing functions 52, 82 and communication control functions 51, 81. Communication under an image transfer protocol is performed between the communication control function 51 and the communication control function 81.

Next, the image output device 1 interprets an XML script of the acquired image output job start command (step S2), and image data which are objects of image output, the objects being described in the XML script, are acquired from the image supply device 2 (step S3).

In the first embodiment, after an image output job start command has been received from the image supply device 2, the image output device 1 controls a processing flow of the image output job. Specifically, the image output device 1 manages progress in image output processing, and information and image data, both being required for image output processing, are acquired from the image supply device 2, as required.

At that time, in the image output device 1, the communication controller 12 specifies an image data file 31 by an object ID (corresponding to an object handle of the PTP in a one-by-one manner) described in the XML script in accordance with the DPS protocol, thereby issuing the file acquisition command "DPS_GetFile" of the XML script. An object ID in a PTP pertaining to a certain object and an object ID in the DPS protocol may be set to a single value or different values. When the object IDs have different values, the object ID of the DPS protocol and the object handle of the PTP are mapped in a one-by-one manner, as necessary.

FIG. 11 shows an example XML script of the file acquisition command "DPS_GetFile" used in the first command. The getFileRequest tag is a tag showing a file acquisition command. The filed tag and a buffPtr tag are arranged at positions lower than the getFileRequest tag. The filed tag is for specifying an object ID of a file which is an object of acquisition. The buffPtr tag is for specifying a pointer of a buffer to be used for receiving the acquired file.

The communication controller 12 converts the file acquisition command "DPS_GetFile" of the DPS protocol into a file acquisition command "GetObject" of the image transfer protocol and then transmits the thus-converted command. The command is transmitted to the image supply device 2 by way of the USB layer and the physical layer.

In place of the file acquisition command "DPS_GetFile" to be used for acquiring all files, a partial file acquisition command "DPS_GetPartialFile" to be used for acquiring a part of a file may be transmitted several times, to thereby acquire the overall file. In such a case, the partial file acquisition command "DPS_GetPartialFile" is converted into a command "GetPartialObject" of the image transfer protocol.

In the image supply device 2, the communication controller 22 reads a file (i.e., an image data file 31) of a specified object ID upon receipt of the command "GetObject" in accordance with the image transfer protocol and transmits the file. The file is transmitted to the image output device 1 by way of the USB layer and the physical layer.

In the image output device 1, when the communication controller 12 has received the file in accordance with the image transfer protocol, the file is also considered to have been received by the DPS protocol layer.

Here, when the image output device 1 is the printer shown in FIGS. 4 and 5 and the image supply device 2 is the digital camera shown in FIGS. 6 and 7, the DPS protocol processing function 52 and the communication control function 51, both belonging to the image output device 1, and the communication control function 81 and the file system management function 83, both belonging to the image supply device 2, are used for acquiring the image data.

In the image output device 1, when the image data are acquired, an image based an the image data is output (step S4). At that time, in the image output device 1, the output controller 13 and the output mechanism 14 perform the image output processing.

Here, when the image output device 1 is the printer shown in FIGS. 4 and 5, the image processing function 53, the print data generating function 54, and the print control function 55 are used for image output processing.

Here, there will be described in detail a DPS protocol processing function 52 of the image output device 1 implemented by the communication controller 12, a communication control function 51 of the image output device 1 implemented by the communicator 11, a DPS protocol processing function 82 of the image supply device 2 implemented by the communication controller 22, and a communication control function 81 of the image supply device 2 implemented by the communicator 21.

Figure 13:
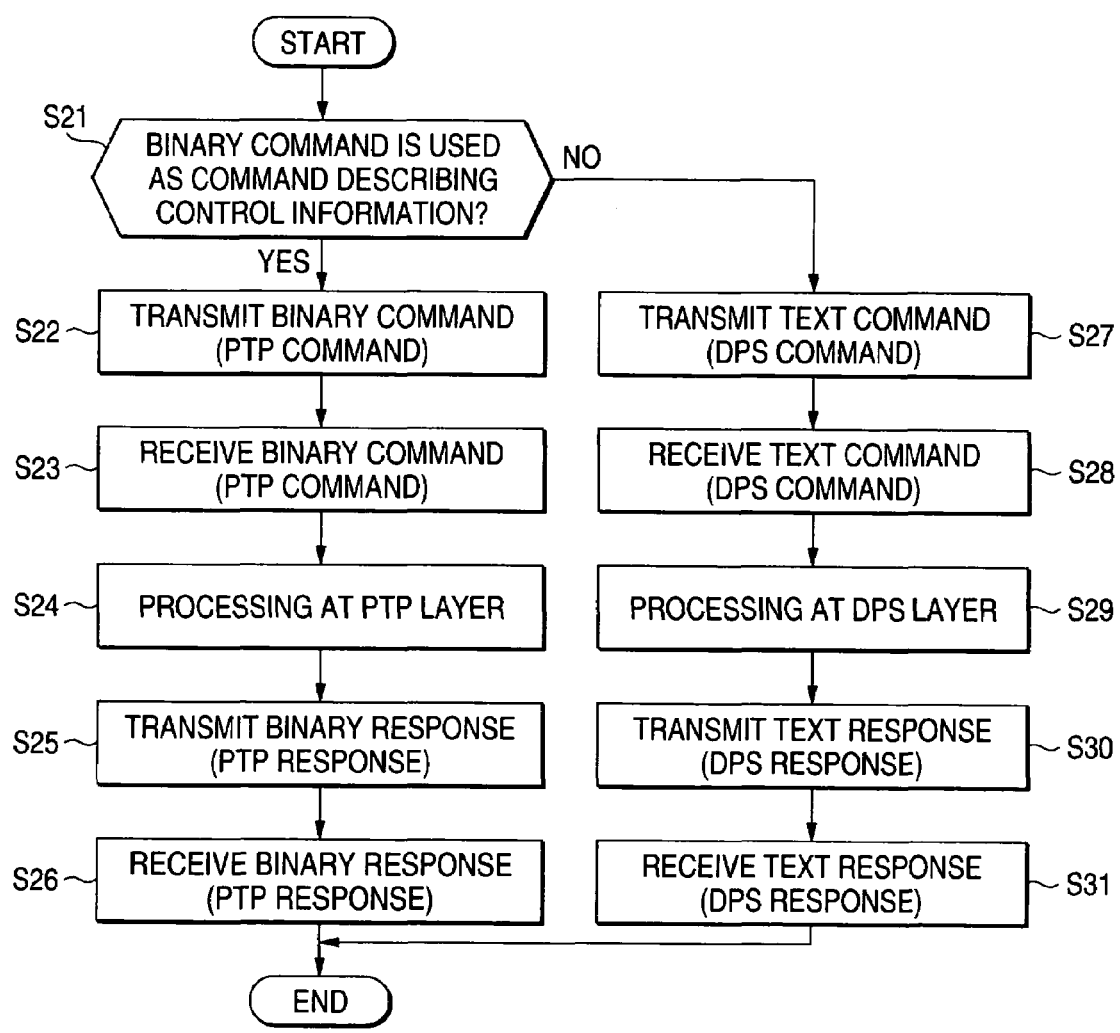
FIG. 13 is a flowchart describing transmission of a command exchanged between the image output device and the image supply device and example flow of a response to the command within the image output system of the first embodiment.

FIG. 12 is a view showing an example flow of a command and an answer (hereinafter described as a "response") thereto exchanged between the image output device 1 and the image supply device 2. FIG. 13 is a view showing a flow chart describing a command and a response thereto exchanged between the image output device 1 and the image supply device 2.

In FIG. 12, a command, a response, and a status notice are exchanged by utilization of a picture transfer protocol (PTP). Further, FIG. 12 shows a case where a command is transmitted from the image output device 1 to the image supply device 2 and a response is transmitted from the image supply device 2 to the image output device 1.

In FIG. 12, the entity of the DPS protocol comprises: an XML command generator 62A on the part of the image output device 1; an XML command executor 82A on the part of the image supply device 2; and an XML response receiver 63A on the part of the image output device 1. The DPS protocol processing function 52 of the image output device 1 is implemented by the XML command generator 62A and the XML response receiver 63A The DPS protocol processing function 82 of the image supply device 2 is implemented by the XML command executor 82A.

In FIG. 12, the entity of the PTP comprises a PTP command executor 51e, and a PTP command executor 81e. The entity of the PTP of the image output device 1 is implemented by the PTP command executor 51e. The image output device 1 has a buffer 51f for temporarily storing a PTP response with respect to the PTP command. The entity of the PTP of the image supply device 2 is implemented by the PTP command executor 81e. The image supply device 2 has a buffer 81f for temporarily storing an XML command.

The wrapper layer of the image output device 1 comprises a PTP command reference table 51a, a determinant 51b, a transmission command generator 51c, an execution command generator 51d, and a PTP response converter 51g.

The XML command generator 62A, the XML response receiver 63A, the PTP command executor 51e, the determinant 51b, the transmission command generator 51c, the execution command generator 51d, and the PTP response converter 51g are implemented by the CPU 41 executing corresponding control programs. The computer-readable control programs are recorded on the ROM 42 or the RAM 43 of the image output device 1, such as a printer. The control programs can be installed from a computer-readable recording medium or by way of a transmission medium. The PTP command reference table 51a is stored in the RAM 43, and the buffer 51f is embodied by the RAM 43.

The XML command executor 82A, the PTP command executor 81e, and the transmission command generator 81c are embodied by the CPU 71 executing corresponding control programs. The computer-readable control programs are stored in the ROM 82 or the RAM 83 of the image supply device 2 such as a digital camera. The control program can be installed from a computer-readable recording medium or by way of a transmission medium. The buffer 81f is embodied by the RAM 73, and the image data file 31 is stored in the memory card 75.

In response to various application programs or user operation, the XML command generator 62A outputs an XML command described in a markup language. The XML command is input to the determinant 51b. The determinant 51b compares the PTP command reference table 51a with the input XML command.

At least a pair consisting of a PTP command and an XML command are stored in association with each other in the PTP command reference table 51a. In the first embodiment, XML commands include the "DPS_GetFile" command, the "DPS_GetPartialFile" command, the "DPS_GetFileList" command, the "DPS_GetThumb" command, and the "DPS_GetFileInfo" command, which enables realization of a one tone correspondence between the PTP commands and the XML commands, are registered. One PTP command is associated with each of the XML commands. The determinant 51b determines whether or not the input XML command is present in the PTP command reference table 51a.

The XML command generator 62A determines whether or not a PTP command is used as a command describing the control information (step S21).

Here, there will be described, by way of an example, a case where the XML command generator 62A outputs the XML command "DPS_GetFileInfo". As shown in FIG. 14A, the "DPS_GetFileInfo" command is described in a structure including a file ID (an object ID). The determinant 51b determines whether or not the input "DPS_GetFileInfo" command is present in the PTP command reference table 51a. In the first embodiment, the "DPS_GetFileInfo" command is present in the PTP command reference table 51a. Hence, the determinant 51b outputs the XML command to the execution command generator 51d.

As shown in FIG. 14B, the execution command generator 51d generates an object handle "ptpObjectHandle" corresponding to the file ID. As shown in FIG. 14C, there is output a PTP command which takes the object handle "ptpObjectHandle" as a first operation parameter and is a binary command of an operation code 0x1008. In the PTP command reference table 51a, the operation code 0x1008 is associated, as the "GetObjectInfo" command of the PTP, with the "DPS_GetFileInfo" command. In the XML command, the file ID is sandwiched between file ID tags, and hence the file ID can be readily extracted through retrieval. The PTP commands are output to the PTP command executor 51e.

The PTP command executor 51e of the image output device 1 transmits the PTP command output from the execution command generator 51d to the PTP command executor 81e of the image supply device 2 (step S22). Upon receipt of the PTP command (S23), the PTP command executor 81e reads, from the memory card 75, an object information data set of the object file corresponding to the object handle designated as a first operation parameter and transmits a response while taking the data set as a PTP response (steps S24, S25). The PTP command executor 51e receives the PTP response (step S26) and writes the received object information data set into the buffer 51f.

FIG. 15 shows an example object information data set. The object information data sets utilized by the PTP comprise a storage ID (StorageID) field, an object format (ObjectFormat) field, a protection status (ProtectionStatus) field, an object compressed size (ObjectcompressedSize) field, a thumbnail format (ThumbFormat) field, a thumbnail compressed size (ThumbCompressedSize) field, a thumbnail picture width (ThumbPixWidth) field, a thumbnail picture height (ThumbPixHeight) field, an image picture width (ImagePixWidth) field, an image picture height (ImagePixHeight) field, a resolution depth (ImageBitDepth) field, a parent object (ParentObject) field, an association type (Association Type) field, an association descriptor (AssociationDesc) field, a sequence number (SequenceNumber) field, a file name (Filename) field, a photographing date (CaptureDate) field, an update date (ModficationDate) field, and a keyword (Keywords) field.

When the object information data set is written as a PTP response into the buffer 51f, the PTP response converter 51g reads the file type from the object format field of the object information data set in the manner as shown in FIG. 14D. Further, a file size is read from the object compressed size field. As shown in FIG. 14E, the "DPS_GetFileInfoResponse" command having the file type tag and the file size tag are generated. The command "DPS_GetFileInfoResponse" is written into the buffer 51f as an XML response. The XML response written in the buffer 51f is read by the XML response receiver 63A.

Through the foregoing processing, the "DPS_GetFileInfo" command which is an XML command is converted into a PTP command (i.e., the "GetObjectInfo" command) which is a binary command. The thus-converted command is transmitted from the image output device 1 to the image supply device 2. A PTP response is transmitted from the image supply device 2 to the image output device 1. An XML response is generated by the image output device 1 on the basis of the PTP response.

The case of a "DPS_GetFile" command will now be described as another example. The "DPS_GetFile" shown in FIG. 16A is supplied to the execution command generator 51d by way of the determinant 51b. The file ID in the "DPS_GetFile" command is converted into an object handle, and the "DPS_GetFile" command is converted into a binary PTP command of the operation code 0x1009, which takes the object handle as a first operation parameter (see FIGS. 16B and 16C). In the PTP command reference table 51a, the operation code 0x1009 is associated with "DPS_GetFile" as a GetObject command of the PTP. The PTP command is transmitted from the PTP command executor 51e to the PTP command executor 81*e* (step S22). Upon receipt of the PTP command (step S23), the PTP command executor 81*e* reads, from the memory card 75, the object file corresponding to the object handle designated as a first operation parameter and transmits the thus-read object file (steps S24, S25). Upon receipt of a response to the PTP command (S26), the PTP command executor 51 e writes the thus-received object file into the buffer 51*f*. The PTP response converter 51*g* computes the size of the object file written in the buffer 51*f*, thereby generating a file size and "DPS_GetFileResponse" having a file size tag for specifying the file size (see FIG. 16D). After having been written into the buffer 51*f*, the command "DPS_GetFileResponse" is read by the XML response receiver 63A.

The "DPS_GetPartialFile" command is converted into a PTP command which is a binary command of the operation code 0x101B and processed in the same manner as is the "DPS_GetFile" command. The "DPS_GetThumb" command is converted into the PTP command, which is a binary command of the operation code 0x100A, and is processed in the same manner as is the "DPS_GetFile" command.

Next, there will be described, by way of still another example, the case of the "DPS_GetFileList" command. The "DPS_GetFileList" command shown in FIG. 17A is supplied to the execution command generator 51*d* by way of the determinant 51*b*. The file type is converted into the object format code (ObjectFormatCode), and the "DPS_GetFileList" is converted into a binary PTP command "GetObjectHandle" of an operation code 0x1007, which takes a storage ID as a first operation parameter and the object format code as a second operation parameter (see FIGS. 17B and 17C).

In the PTP command reference table 51*a*, the operation code 0x1007 is associated with the "DPS_GetFileUst" command as a "GetFileList" command of the PTP. In the XML command, the object format code is sandwiched between file type (FileType) tags and can be readily extracted from the XML command. The PTP command is transmitted from the PTP command executor 51*e* to the PTP command executor 81*e* (step S22). The PTP command executor 81*e* transmits the list of the object handles of the object file that match in file type with the object format code designated as the second operation parameter (steps S24, S25). The PTP command executor 51*e* writes the thus-received list of object handles into the buffer 51*f*. The PTP response converter 51*g* counts the number of object handles written into the buffer 51*f*, thereby generating an object ID corresponding to the object handle and an image ID tag for designating the object ID and the number of objects (NumberOfFile) and a "DPS_GetFileResponse" having an ID number tag for specifying the number of objects (see FIG. 17D) After having been written into the buffer 51*f*, the "DPS_GetFileListResponse" command is read by the XML response receiver 63A.

There will now be described the case of execution of an XML command other than the "DPS_GetFile", "DPS_GetPartialFile", "DPS_GetFileList", "DPS_GetThumb", and "DPS_GetFileInfo" commands (hereinafter called "another XML command"). When the other XML command is output from the XML command generator 62A, the determinant 51*b* transmits the other XML command to the transmission command generator 51*c*, since the input other XML command is not present in the PTP command reference table 51*a*.

The transmission command generator 51*c* outputs a PTP transmission command which transmits the other XML command as data. As a result, there is executed processing for transmitting the other XML command from the PTP command executor 51*e* to the PTP command executor 81*e*. Specifically, the XML command (DPS command) is transmitted as one data file (step S27) At that time, a "SendObjectInfo" command and a "SendObject" command of the PTP are used.

Specifically, as shown in FIG. 18A, for each XML command, there are generated an object handle and an object information data set for storing the data size of the other XML command as an object compressed size. The PTP command executor 51*e* transmits the object information data set to the PTP command executor 81*e* through use of the "SendObjectInfo" command of the PTP. As a result, the file information about the other XML command is transmitted.

Upon receipt of the response to the "SendObjectInfo" command from the PTP command executor 81*e*, the PTP command executor 51*e* transmits the other XML command to the PTP command executor 81*e* as a data file through use of the "SendObject" command of the PTP. As a result, the other XML command is transmitted as a data file.

The PTP command executor 81*e* receives an XML command as one data file (step S28), and another received XML command is stored in a buffer 81*f*. When receipt of the data file has been properly completed, the PTP command executor 81*e* transmits to the PTP command executor 51*e* a PTP response reporting normal receipt. As a result, processing for transmitting another XML command as data is completed.

The other XML command written in the buffer 81*f* is executed by the XML command executor 82A (step S29). The XML command executor 82A generates a result of execution of the other XML command as an XML response which is an XML script. The XML response is supplied to the transmission command generator 81*c*.

The transmission command generator 81*c* outputs a PTP transmission command for transmitting an XML response, which is text data, as one data file (step S30). As a result, processing for transmitting an XML response from the PTP command executor 81*e* to the PTP command executor 51 is executed.

Specifically, as shown in FIG. 18B, the object handle and the object information data set are generated for each XML response. The PTP command executor 81*e* transmits a transfer request to the PTP command executor 51*e* through use of the RequestObjectTransfer command of the PTP. Upon receipt of the "RequestObjectTransfer" command, the PTP command executor 51*e* acquires the XML response as a data file through use of the "GetObjectInfo" command and the "GetObject" command.

Specifically, the PTP command executor 51*e* transmits to the PTP command executor 81*e* the "GetObjectInfo" command that has specified the received object handle. The PTP command executor 81*e* generates an object information data set in which a data size of the XML response is stored as an object compressed size, and transmits the data set to the PTP command executor 51*e*.

Subsequently, the PTP execution command 51*e* transmits, to the PTP command executor 81*e*, the "GetObject" command that has specified the received object handle. The PTP command executor 81*e* transmits the XML response as data to the PTP command executor 51*e*.

The PTP command executor 51*e* stores the received XML response to the buffer 51*f*. As a result, processing for transmitting the XML response as data is completed. The XML response written in the buffer 51*f* is read into the XML response receiver 63A. Specifically, the XML response is received at the DPS protocol layer (step S31).

Through the foregoing processing, the XML commands (other XML commands) other than the "DPS_GetFile", "DPS_GetPartialFile", "DPS_GetFileList", "DPS_GetThumb", and "DPS_GetFileInfo" commands are transmitted from the image output device 1 to the image supply device 2 as data of the PTP transmission command. XML responses corresponding to the other XML commands are generated by the image supply device 2, and the thus-generated XML responses are transmitted as data from the image supply device 2 to the image output device 1.

As mentioned above, according to the first embodiment, the XML commands associated with the binary PTP commands are converted into the PTP commands by the PTP command reference table 51a serving as a table, and the thus-converted commands are transmitted. Consequently, the quantity of data to be transmitted can be curtailed as compared with a case where the XML commands which are text data described in a markup language are transmitted in unmodified form.

Particularly, as shown in FIGS. 14A, 14E, 16A, 16C, 17A, and 17C, each XML command assumes a format structure, wherein a data set corresponding to each parameter of the PTP command is sandwiched between name tags (hereinafter described as "parameter tags") corresponding to the parameter name of the data in a one-to-one correspondence, and the tags are further sandwiched between name tags (hereinafter described as "command tags") corresponding to the name of an XML command in a one-to-one correspondence.

Consequently, the execution command generator 51d extracts a command tag of the XML command; extracts from the PTP command reference table 51a a PTP command corresponding to the command tag; extracts, from the XML command, a parameter tag associated with the PTP command in the PTP command reference table 51a; and extracts the data sandwiched between the parameter tags as parameter data of the PTP command, thereby enabling generation of the PTP command. As a result, the execution command generator 51d can accurately generate a PTP command while ignoring other parameters even when the XML command includes unwanted text data or tags; e.g., other parameter tags which can be utilized by a lower-level protocol other than the PTP.

Further, a command pertaining to image output is first generated as an XML command described in a markup language. When the XML command cannot be converted into a PTP command, the XML command per se is transmitted as data from the PTP command executor 51e to the PTP command executor 81e. Specifically, if the image output device 1 or the image supply device 2 corresponds to at least the XML command, the device is connected to all the image output devices 1 or the image supply devices 2 corresponding to the image output system, thereby enabling exchange of commands pertaining to image output. Consequently, vendors of the image supply device 2 do not need to individually develop the PTP command, executor 51e or other binary communicator. Moreover, vendors of the image supply device 2 do not need to individually develop the PTP command executor 81e and other binary communicator.

Consequently, the vendor that has already supplied the image supply devices 2 can impart versatility to a control operation pertaining to image output, by utilizing existing binary communicator that have already been developed, to thus work with the image output system while the originality of the image supply device 2 of the vendor is maintained. Further, even when a vendor newly attempts to supply the image supply device 2, a high level of compatibility between originality and versatility can be achieved by newly developing binary communicator or the like.

In the first embodiment, the PTP command executor 51e transmits a result of execution of the PTP command as a PTP response. The XML command executor 82A generates a result of execution of the XML command as an XML response; transmits the XML response as data to the PTP command executor; and has PTP response converter 51g for generating an XML response on the basis of the PTP response received by the PTP command executor 51e, and XML response receiver 63A for receiving the XML response received by the PTP command executor 51e as data and the XML response generated by the PTP response converter 51g. Consequently, even when the XML command pertaining to image output has been executed as a PTP command or when the XML command has been executed as an XML command, the result of execution can be output as an XML response.

The first embodiment has described, by way of an example, a case where the binary command is a PTP command, but the binary command to be converted from the XML command may be a binary command of another low-level protocol. The XML command to be converted into a binary command may be a text command described in a markup language other than XML.

In the first embodiment, the image output device 1 transmits a command to the image supply device 2, and the image supply device 2 transmits a corresponding response to the image output device 1. However, for instance, the image supply device 2 may transmit a command to the image output device 1, and the image output device 1 may transmit a corresponding response to the image supply device 2. In this case, the image supply device 2 has constituent elements corresponding to those of the image output device 1 shown in FIG. 12, and the image output device 1 has constituent elements corresponding to those of the image supply device 2 shown in FIG. 12. Moreover, the image output device 1 and the image supply device 2 may exchange commands and corresponding responses.

According to the first embodiment, the image output device 1 and the image supply device 2 communicate control information pertaining to image output as a series of scripts described in a markup language by way of the communication channel 3. As a result, correction of the protocol after prescription can be facilitated by utilization of extensibility of the syntax of a markup language while compatibility among a plurality of vendors is maintained.

According to the first embodiment, an XML which enables additional definition of a document type is used as a markup language. As a result, correction of the protocol after prescription can be facilitated.

According to the first embodiment, each of the communication controllers 12, 22 serves as a first entity for interpreting a DPS protocol to be used for exchanging control information pertaining to image output described in a markup language; a second entity which is located at a level lower than the first entity and interprets a PTP to be used for managing the image data file stored in the image supply device 2 and transferring the image data to the image output device 1; and a third entity which is located at a level lower than the second entity and controls a physical layer (a USB in this embodiment) of the communication channel 3. As a result, various existing protocols can be used at hierarchical levels lower than the PTP. When correction of a protocol pertaining to image output is desired after the protocol has been prescribed, the only requirement is to amend the DPS protocol, and hence the amount of correction can be reduced.

According to the first embodiment, the communication controllers 12, 22 convert the DPS protocol of the first entity into the image data file management transfer protocol or vice versa in accordance with the kind of image data file management transfer protocol of the second entity (PTP in the embodiment) at a wrapper layer. As a result, the wrapper layer absorbs a difference between the adopted image data file management transfer protocols Hence, when correction of a protocol pertaining to image output is desired after having been prescribed, the only requirement is to amend the image output control protocol without involvement of any substantial corrections on the wrapper layer, and hence the amount of correction can be reduced.

According to the first embodiment, the output controller 13 of the image output device 1 controls the processing flow of image output operation. As a result, the volume of information processing to be performed by the image supply device 2 essentially does not increase. Hence, the present system can be embodied even when the image supply device has a low level of information processing performance.

According to the first embodiment, the communication controllers 12, 22 communicate, as control information pertaining to image output and in the form of a series of scripts described in a markup language, a control command for image output processing, a response to the control command, and notification of a status of the device (including a job status). As a result, a control command which is on a text basis and easy to read, a response to the control command, and notification of status of the device can be communicated, and the protocol can be made easy to correct after prescription while compatibility between a plurality of vendors is maintained.

According to the first embodiment, the communication controllers 12, 22 communicate, as a series of scripts described in a markup language, a script which does not include image data to be an object of image output and includes only control information pertaining to image output. As a result, the control information described in a markup language can be communicated independently of the data which are to become an object of image output, without modifying the format of data to be an object of image output from an existing format.

According to the first embodiment, the image output device 1 has an output mechanism 14 for outputting an image, and an output controller 13 which produces, from image data, control data to be used for controlling an output mechanism and controls the output mechanism on the basis of the control data. As a result, the image supply device 2 can be dispensed with a function for producing, from image data, control data to be used for controlling the output mechanism (e.g., a function included in a conventional printer driver used in a personal computer), and hence the image supply device 2 can be made inexpensive.

According to the first embodiment, when the XML server 63 of the image output device 1 is configured to determine only a tag required to describe the control information pertaining to image output from among the tags described in a markup language, the XML server 64 can be implemented by a small-amount circuit or program, thereby rendering the image output device 1 inexpensive.

According to the first embodiment, when the XML server 93 of the image supply device 2 is configured to determine only a tag required to describe the control information pertaining to image output from among the tags described in a markup language, the XML server 93 can be implemented by a small-amount circuit or program, thereby rendering the image supply device 2 inexpensive.

According to the first embodiment, the communication controllers 12, 22 store templates of scripts according to types of control information and produce scripts of control information from the templates. As a result, only portions for which templates have not been determined must be edited, thereby enabling generation of a script of control information within a short time period.

According to the first embodiment, when a predetermined operation has been performed by way of the control panel 25, the communication controller 22 and the communicator 21, both belonging to the image supply device 2, transmit an image output job start command to the image output device 1 as control information. Upon receipt of the image output job start command by way of the communication controller 12 and the communicator 11, the output controller 13 of the image output device 1 commences image output processing in accordance with the image output job start command. As a result, the image output can be performed by the user operating the control panel 25 of the image supply device 2. When the image supply device 2 has the user-friendly control panel 25, operability of the control panel 25 is improved.

According to the first embodiment, when the image data stored in the image supply device 2 are required during image output processing, the communication controller 12 of the image output device 1 transmits to the image supply device 2 a request for transmission of image data. Upon receipt of the request for transmission of the image data, the communication controller 22 of the image supply device 2 transmits the image data to the image output device 1. As a result, the only requirement for the image supply device 2 is to send the image data in accordance with the request from the image output device 1. Hence, the quantity of image processing operation of the image supply device 2 essentially does not increase, and the present system can be embodied even when the image supply device 2 has a low level of information processing performance.

In a second embodiment of the invention, the entity of the DPS protocol is arranged to have an interface for exchanging a command and a corresponding response with an application using functions of the DPS protocol, and determines whether to use an XML command (text command) or a PTP command (binary command) in accordance with the type of a command output from the application received by the interface.

Figure 19A:
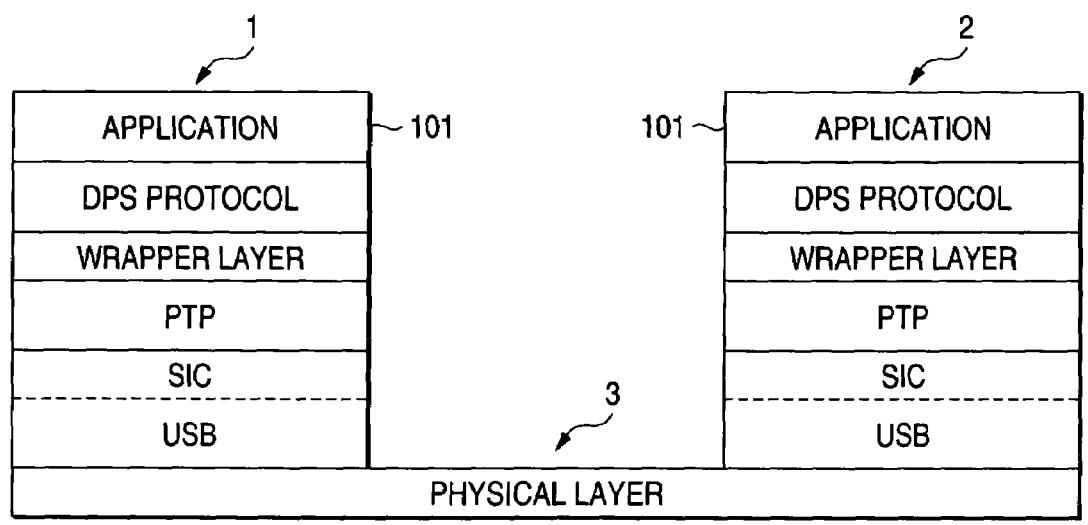
FIG. 19A is a view showing an example protocol used between an image output device and an image supply device within an image output system according to a second embodiment of the invention.
Figure 19B:
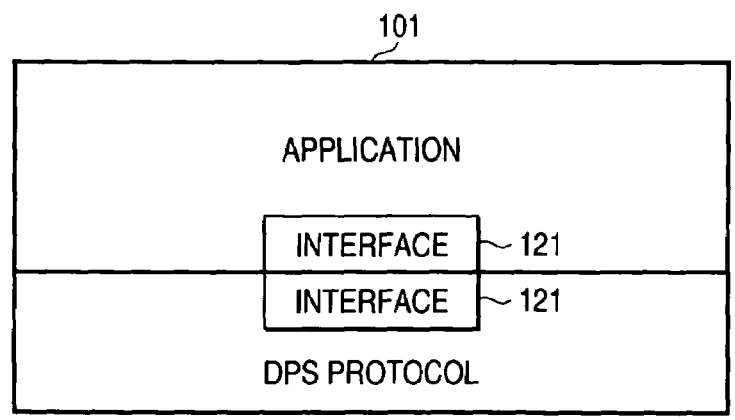
FIG. 19B is a view showing an example interface between the entity of a DPS protocol and an application within an image output system of the second embodiment.

FIG. 19A is a view for showing an example protocol used between the image output device 1 and the image supply device 2 in an image output system according to the second embodiment. FIG. 19B is a view showing an example interface between the entity of the DPS protocol and the application. As shown in FIG. 19A, an application 101 using the functions of the DPS protocol is added to a level higher than the DPS protocol. The application 101 is implemented by a CPU executing a program in which various processing operations are described. The entity of the DPS protocol is implemented by the CPU executing a program which embodies the functions of the DPS protocol. As shown in FIG. 19B, the application 101 and the entity of the DPS protocol each have an interface 121 and exchange a command and a response by use of the interfaces 121.

The application 101 and the entity of the DPS protocol are executed as separate tasks and exchange a command and a response by intertask communication between the interfaces 121.

In the second embodiment, each of the interfaces 121 has a message box used for intertask communication. When the application 101 has written a command into the interface 121 of the entity of the DPS protocol, the entity of the DPS protocol reads and executes the command. When the entity of the DPS protocol has written a response into the interface 121 of the application 101, the application 101 reads and receives the response.

Figure 20:
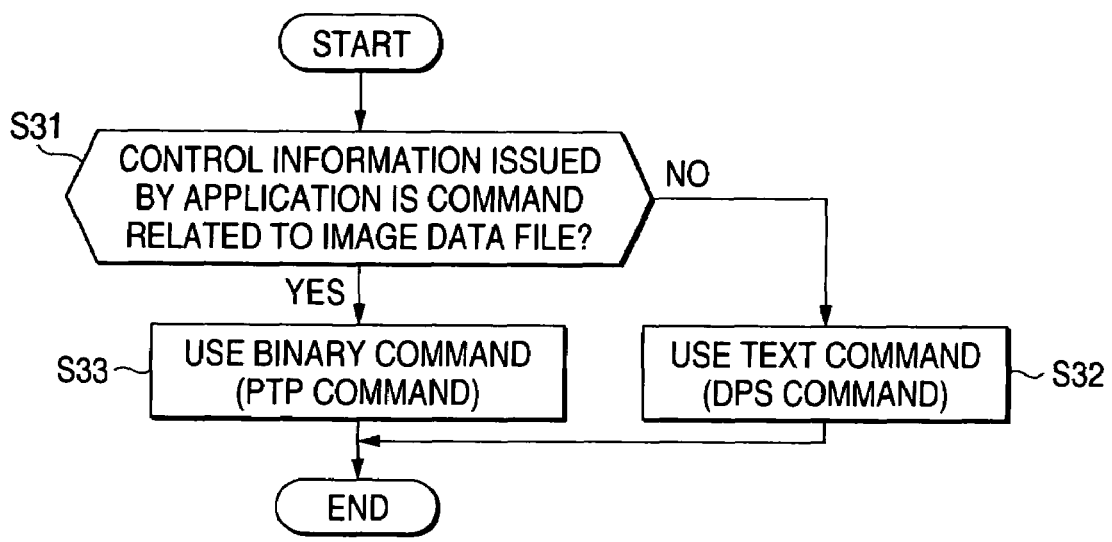
FIG. 20 is a flowchart showing an example method for determining the type of a command of the second embodiment.

The interface 121 of the entity of the DPS protocol determines whether to use an XML command or a PTP command, in accordance with the type of a command output from the application 101. FIG. 20 is a flowchart showing an example method for determining the type of a command.

The interface 121 of the entity of the DPS protocol determines whether the command output from the application is a command pertaining to an image data file, a command for acquiring attribute information of the image data file, or a command for acquiring an image data file (step S31).

When having determined that the command output from the application 101 is not a command pertaining to an image data file, the interface 121 of the entity of the DPS protocol generates and transmits an XML command corresponding to the command (step S32).

When having determined that the command output from the application 101 is a command pertaining to an image data file, the interface 121 of the entity of the DPS protocol generates a PTP command corresponding to the command without generating an XML command corresponding to the command and transmits the thus-generated PTP command (step S33).

In connection with other processing operations, the second embodiment is analogous to the first embodiment, and hence its explanation is omitted. The application 101 of the second embodiment is not limited to a single application; a plurality of applications using the functions of the DPS protocol may be present. In such a case, the image output system has an interface for exchanging a command and a corresponding response with an application using the functions of the DPS protocol and determines whether to use an XML command (text command) or a PTP command (binary command) in accordance with the type of the command output from the application received by the interface.

As mentioned above, according to the second embodiment, in accordance with the type of the command output from the high-level application 101, a determination is made as to whether to use, as a command to be used for communication, an XML command formed from a text command or a PTP command formed from a binary command. Therefore, when the PTP command is available, a necessity for generating an XML command is obviated.

The previously-described embodiments are preferable examples of the invention. However, the invention is not limited to these embodiments. The invention is susceptible to various modifications or alterations within the scope of the invention.

For instance, in the respective embodiments, control information is described through use of XML which is one of the markup languages. However, another markup language such as SGML (Standard Generalized Markup Language) may be used for describing the control information.

In the previously-described respective embodiments, the PTP and the USB are used at hierarchical levels lower than the DPS protocol level. However, another protocol, such as a TCP/IP (Transmission Control Protocol/Internet Protocol) may also be used. At that time, a LAN cable, Bluetooth, a wireless LAN, or the like may also be used as a transmission medium.

The command names and the tag names of the DPS protocol used in the respective embodiments are not limited to those mentioned previously; other names may also be employed. Commands of the DPS protocol may also be embodied by other commands having the same function or a combination thereof.

In the respective embodiments, the image output device 1 can be embodied as a printer, and the image supply device 2 can be embodied as a digital camera for recording a moving image and/or a still image. Alternatively, the image output device 1 may also be embodied as another recording device for recording an image on a medium such as paper or a display for projecting an image of light such as a display. The image supply device 2 may also be embodied as an electronic device having a built-in digital camera or an electronic device which receives an image signal. Such an electronic device includes a mobile telephone, a PDA, a music player, a TV set, a video recording/reproducing apparatus, a picture phone, a videoconferencing system, etc. Further, the image supply device 2 may be embodied as a device having portability or a device not having much portability.

In the respective embodiments, upon completion of transfer of the image data required for image output from the image supply device 2 to the image output device 1, a notice indicating that connection with the image output device 1 can be released may be transmitted from the image output device 1 to the image supply device 2.

In the respective embodiments, a USB mass storage class may also be employed as the image data file management transfer protocol in place of the PTP.

The images described in connection with the embodiments may be embodied as text images in addition to picture images. Further, the object of image output may be a text, e.g., a title table or lyrics of a music album, such as a music CD or a music MD. In this case, for instance, the image supply device 2 or the image output device 1 acquires text data from a distribution server on the Internet in accordance with the information recorded on a music album.

What is claimed is:

1. An image processing method, performed by an image supply device storing image data and an image output device performing image processing with respect to the image data, which are connected via a communication path through which the image data is communicated, the method comprising steps of:

selecting, at one of the image supply device and the image output device, one of a text command described by a markup language and a binary command described by a binary, as a command including a control information item for the image processing;

transmitting, from one of the image supply device and the image output device to the other, the selected one of the text command and the binary command; and performing, at the other one of the image supply device and the image output device, processing specified by the control information included in the selected one of the text command and the binary command.

2. The image processing method as set forth in claim 1, further comprising a step of judging whether the control information item can be described by the binary, wherein the selecting step is performed so as to select the binary command in a case where it is judged that the control information item can be described by the binary.

3. The image processing method as set forth in claim 1, further comprising steps of:

transmitting, to the one of the image supply device and the image output device from the other one, text data including a response indicating a result of the step of performing the processing, in a case where the text command is selected in the selecting step; and transmitting, to the one of the image supply device and the image output device from the other one, binary data including a response indicating a result of the step of performing the processing, in a case where the binary command is selected in the selecting step.

4. The image processing method as set forth in claim 1, wherein the text command is a command specified by a first protocol, and the binary command is a command specified by a second protocol which is a lower hierarchical protocol than the first protocol.

5. The image processing method as set forth in claim 4, wherein the text command is transmitted as a file by a file transmission command which is specified by the second protocol.

6. The image processing method as set forth in claim 1, wherein the selecting step is performed in accordance with a kind of a command issued by an application which is available in at least one of the image supply device and the image output device.

7. The image processing as set forth in claim 1, wherein the selecting step is performed in accordance with a kind of the application which issues a command with respect to at least one of the image supply device and the image output device.

8. An image processing system, comprising:
an image supply device, operable to store image data; and
an image output device, connected to the image supply device via a communication path through which the image data is communicated, and operable to perform image processing with respect to the image data,
wherein at least one of the image supply device and the image output device comprises:
a binary transmitter, which transmits a binary command described by a binary;
a text transmitter, which transmits a text command, which is described by a markup language, as a file specified by a file transmission command which is one of binary commands; and
a controller, operable to judge whether a command including a control information item for the image processing to be performed can be described by the binary; operable to control the binary transmitter to transmit the command as the binary command in a case where it is judged that the command can be described by the binary; and operable to control the text transmitter to transmit the command as the text command in a case where it is judged that the command cannot be described by the binary; and
wherein at least the other one of the image supply device and the image output device comprises:
a binary receiver, which receives the transmitted binary command;
a text receiver, which receives the transmitted text command;
a binary executor, which executes processing specified by the control information item included in the received binary command; and
a text executor, which executes processing specified by the control information item included in the received text command.

9. An image output device, connected to an image supply device storing image data via a communication path through which the image data is communicated, the image output device comprising:
a binary transmitter, which transmits a binary command described by a binary;
a text transmitter, which transmits a text command, which is described by a markup language, as a file specified by a file transmission command which is one of binary commands; and
a controller, operable to judge whether a command including a control information item for image processing to be performed can be described by the binary; operable to control the binary transmitter to transmit the command as the binary command in a case where it is judged that the command can be described by the binary; and operable to control the text transmitter to transmit the command as the text command in a case where it is judged that the command cannot be described by the binary.

10. An image supply device, connected to an image output device performing image processing via a communication path, the image supply device comprising:
a storage, which stores image data to be transmitted through the communication path and subjected to the image processing;
a binary receiver, which receives a binary command described by a binary and transmitted from the image output device;
a text receiver, which receives a text command described by a markup language and transmitted from the image output device;
a binary executor, which executes processing specified by a control information item for the image processing which is included in the received binary command; and
a text executor, which executes processing specified by a control information item for the image processing which is included in the received text command.

11. A printer, adapted to be directly connected to a digital camera storing an image data file by way of a communication path, and operable to communicate control information related to image printing with the digital camera via the communication path, the printer comprising:
a printing section, operable to perform image printing;
a binary communicator, operable to communicate a data file including the image data file, and a binary control command;
a markup control command generator, operable to generate a text-format markup control command which is described by a markup language;
a first transmitter, operable to cause the binary communicator to transmit a binary control command instructing the digital camera to transmit the image data file, when the printer acquires the image data file from the digital camera;
a second transmitter, operable to cause the binary communicator to transmit a markup control command including control information other than the image data file, as a data file, when the printer transmits the control information; and
a markup executer, operable to cause the printing section to print an image based on the image data file acquired by the binary communicator, in accordance with a markup control command received by the binary communicator from the digital camera as a data file.

* * * * *